US006672063B1

(12) United States Patent
Proeschel

(10) Patent No.: US 6,672,063 B1
(45) Date of Patent: Jan. 6, 2004

(54) RECIPROCATING HOT AIR BOTTOM CYCLE ENGINE

(76) Inventor: Richard Alan Proeschel, 414 Pepperwood Ct., Thousand Oaks, CA (US) 91360-2842

(*) Notice: Subject to any disclaimer, the term of this patent is extended or adjusted under 35 U.S.C. 154(b) by 0 days.

(21) Appl. No.: 10/255,041

(22) Filed: Sep. 25, 2002

(51) Int. Cl.[7] .................................................. F02G 3/00

(52) U.S. Cl. .............................. 60/616; 60/646; 60/660

(58) Field of Search .......................... 60/614, 616, 508, 60/646, 660

(56) References Cited

U.S. PATENT DOCUMENTS

| | | | | |
|---|---|---|---|---|
| 3,708,979 A | | 1/1973 | Bush | |
| 4,333,424 A | | 6/1982 | McFee | |
| 4,751,814 A | | 6/1988 | Farrell | |
| 5,442,904 A | | 8/1995 | Shnaid | |
| 5,894,729 A | | 4/1999 | Proeschel | |
| 5,896,740 A | * | 4/1999 | Shouman | 60/39.182 |
| 6,065,283 A | * | 5/2000 | Shouman | 60/39.182 |
| 6,186,126 B1 | * | 2/2001 | Gray, Jr. | 123/557 |
| 6,216,462 B1 | | 4/2001 | Gray, Jr. | |
| 6,301,891 B2 | | 10/2001 | Gray, Jr. | |
| 6,390,185 B1 | | 5/2002 | Proeschel | |
| 6,415,607 B1 | | 7/2002 | Gray, Jr. | |

* cited by examiner

*Primary Examiner*—Hoang Nguyen

(57) ABSTRACT

The invention is a reciprocating bottom cycle engine whose principal is heat addition by recovering heat from a top cycle engine through a counterflow heat exchange recuperator. The engine operation approximates the ideal bottom cycle for recovering heat from a top cycle: isothermal compression, recuperative heating, and constant entropy expansion. Such a cycle is capable of utilizing all the work potential between the hot top cycle exhaust and cool ambient temperature. Practical engines operating on this cycle do not achieve the ideal performance but are superior to Stirling or Ericsson Cycle engines in the amount of exhaust heat that can be converted to mechanical work and have been shown to be capable of enabling a typical natural gas fired engine to produce 17% more power from the same amount of fuel. All moving parts are lightly loaded and are only exposed to clean air, thus assuring long engine life with minimal maintenance. Furthermore, many of the bottom cycle parts can be obtained from existing reciprocating engines and it is even possible to integrate the top and bottom cycle engines on the same engine block. The invention provides a simple "bolt on" means of increasing fuel efficiency by increasing power without increasing fuel consumption.

16 Claims, 20 Drawing Sheets

RECIPROCATING HOT AIR BOTTOM CYCLE ENGINE

BACKGROUND OF THE INVENTION

1. Field of the Invention

This invention relates in general to bottom cycle engines for utilizing the waste exhaust heat of an engine to produce mechanical work. In particular it relates to an improved reciprocating hot air engine that provides a simple, low cost to manufacture, means for recovering energy otherwise lost in the exhaust of an internal combustion, gas turbine or similar heat engine.

2. Description of Prior Art

The rising cost of fuels and concern about the environmental effects of burning those fuels have increased the need for developing novel methods for obtaining the maximum amount of heat and mechanical power from the combustion process. One very effective measure is to recover as much of the heat as possible from the exhaust gases. There are two general types of combustion processes, low pressure and high pressure, and each type has optimal methods for recovering the exhaust heat.

Low pressure combustion processes are used by steam boilers and industrial heating processes. In both cases, combustion occurs in a furnace that is essentially at atmospheric pressure. The most direct method for reducing the fuel requirements in these low-pressure processes is to use a counterflow heat exchanger to heat the incoming air with the hot exhaust gases. Alternatively, mechanical work can be obtained from a bottom cycle engine that is heated by the exhaust. The most effective method of recovering heat from a low-pressure combustion process is to combine both the air preheating and mechanical work recovery methods with an Afterburning Ericsson Cycle Engine as described in my U.S. Pat. No. 5,894,729 (1999). This engine can integrate the furnace process into the engine process by simply using the furnace as the afterburner. With this engine, the furnace receives a forced draft of hot air from the engine expander exhaust and the furnace then provides the hot exhaust back to the engine to produce mechanical work.

High-pressure combustion processes are the most common type of engine combustion process and are found in spark-ignition, Diesel, and gas turbine engines throughout the world. Their wide use makes them an ideal market for devices to effectively recover exhaust heat. Because their combustion process is high pressure, it cannot be integrated as the low-pressure afterburner of an Afterburning Ericsson Cycle engine. Instead, gas turbines can use a heat exchanger (generally termed a recuperator) to use the hot exhaust from the expander turbine to preheat the air from the compressor turbine to greatly improve the gas turbine engine efficiency. Nevertheless, adding a recuperator greatly alters the engine because of the need to insert a large heat exchanger into the otherwise compact engine. For this reason it is very difficult, and often impossible, to modify an existing, aircraft type, gas turbine engine for a recuperator.

Spark-ignition and Diesel engines are not able to use a recuperator and instead frequently use some form of "bottom cycle" where another engine is attached to the exhaust to use the exhaust heat and/or pressure to drive another engine. Such a system of two engines is called a combined cycle engine and consists of the spark-ignition, Diesel, or gas turbine engine (the top cycle engine) and a bottom cycle engine that is attached to the top cycle engine's exhaust.

Gas turbine top engines are commonly joined with Rankine cycle bottom engines to make a very effective combined cycle engine that is widely used in large powerplants. The Rankine cycle makes a very effective bottom cycle that can effectively use much of the top cycle exhaust heat. However, the complexity and potential safety issues of the Rankine cycle engine are not justified for smaller, "micro-generation" applications of less than 100-kilowatt output that are now entering the distributed power market.

Turbochargers have become the most common form of bottom cycle engine for spark-ignition and Diesel top cycles. Turbochargers use the hot, high pressure, exhaust from the top cycle to spin a turbine that is connected to a compressor that boosts the pressure of the air entering the top cycle engine. The boost pressure increases the mean effective pressure of the top cycle engine and increases its power. Turbochargers work very well with Diesel engines because they have no combustion limits from the increased boost pressure. There is a penalty in reliability and durability however.

Although a turbocharger can increase the power of a spark-ignition engine, there is usually very little gain in efficiency. The increased boost pressure leads to increased risk of detonation. Consequently, turbocharged engines are "detuned" from their normally aspirated versions by reducing the compression ratio and adjusting the ignition timing. As a result, although capable of increased power, a turbocharged spark-ignition engine frequently " . . . lowers fuel economy in comparison to the same engine naturally aspirated. The decision to use supercharging in this way is more one of marketing than one of utility." [Taylor, Charles Fayette: "The Internal Combustion Engine in Theory and Practice, Vol II", The M.I.T. Press (1995) p. 367].

It would seem that a bottom cycle based on Stirling or Ericsson Cycle engines would be ideal. The theoretical efficiency of both these engines is the same as a Carnot engine—the maximum efficiency possible with a supply of heat at one temperature and a reservoir at a lower temperature for receiving the exhaust. However, a bottom cycle engine meets only half the Carnot engine requirements; although the surroundings provide the necessary constant temperature reservoir, the heat from a top cycle exhaust is not available at a constant temperature.

FIG. 1 shows a temperature-entropy diagram of a typical top cycle and resulting exhaust heat loss. Top cycle engines operate by taking in air at state 1, compressing it to state 2, then heating in either an approximately constant pressure or constant volume process from state 2 to state 3, and finally expanding it from state 3 to the exhaust at state 4. Because FIG. 1. is a temperature entropy diagram, the potential for generating mechanical work from the heat wasted in the top cycle exhaust is defined by the shaded area, A-1-4-A. A-1-4-A describes the difference between the heat available to the bottom cycle from the top cycle exhaust and the potential heat rejection to the surroundings by the bottom cycle. A bottom cycle engine must then be one that is capable of operating at maximum efficiency with a supply of heat of heat obtained by cooling the top cycle exhaust from state 4 to state 1 while rejecting its own heat at nearly the temperature of the surrounding environment, temperature 1-A. The ideal engine is one that best fills that area; A-1-4-A.

FIG. 2 shows an attempt to use an ideal Stirling engine cycle as a bottom engine. The Stirling engine is a closed cycle engine that starts with a low pressure gas at state A, the temperature of the environment. The gas is compressed at constant temperature to a higher pressure at state B, heated in a regenerator from state B to state C, and expanded in an expander from state C to state D. It is then cooled back to the surrounding temperature, state D to state A, in the regenerator (by giving up the same heat used to warm it from state B to state C). The Stirling engine receives heat from the top cycle exhaust during the expansion process, state C to state D; and rejects it to the environment in the compression process of state A to state B.

Although it efficiently uses what heat it can extract from the top cycle, the Stirling engine is not efficient in obtaining that heat. First, the upper temperature of the cycle (temperature of states C and D) is limited by a heat balance across the expander heat exchanger. The enthalpy change in the top cycle exhaust in going from its state 4 to the temperature of state C, $(H_4-H_C)_{top}$, is equal to the Stirling engine's upper temperature multiplied by the entropy change between state D and state C:

$$[Wdot\ T_{c\text{-}d}\ (S_d-S_c)]_{Stirling}=[Wdot\ (H_4-H_C)]_{top} \tag{1}$$

where Wdot is the respective mass flowrate.

Because $T_{c\text{-}d}$ is less than the potential peak temperature, $T_4$, the potential to make work is reduced. That reduction is indicated in the "Peak Temperature Heat Loss" area in FIG. 2.

Second, the Stirling engine cannot cool the top cycle exhaust any lower than the temperature at state C and D, $T_{c\text{-}d}$. The exhaust from the top cycle will still be at that high temperature. The inability to extract heat from the top cycle represents a major loss in the potential to make work and is shown by the "Top Cycle Exhaust Heat Loss" in FIG. 2.

An Ericsson cycle engine has essentially the same limitations as the Stirling in adapting to a bottom cycle. Referring to FIG. 3, The Ericsson engine is an open cycle engine that takes in ambient air at state A and compresses it at constant temperature to state B. The air is then heated from state B to state C in a heat exchanger that allows it to recover the top cycle exhaust heat. The Ericsson expansion process state C to state D is identical to the Stirling's—constant temperature with heat obtained from the top cycle exhaust.

The exhaust at state D now has no use for making mechanical work. It cannot be used in the Ericsson cycle recuperator because it would only be offset by reduced heat obtained from the top cycle exhaust (the Stirling situation). The Ericsson exhaust heat cannot be used by a spark-ignition or Diesel engine because the Ericsson exhaust is at ambient pressure and the combustion process in those topping cycles is at high pressure. If the top cycle is a gas turbine, the bottom cycle exhaust heat could be used in a recuperator heat exchanger between the top cycle compressor and combustor, but there is little sense in adding both another recuperator and a bottom cycle engine when a single recuperator could do the same job. The Ericsson cycle then has the same lost potential as the Stirling, represented by the shaded heat loss areas in FIG. 3. (The "lost" heat could be used to heat air or water but that is not the objective here.)

FIG. 4 shows a temperature entropy diagram for the ideal bottom cycle engine. Air is taken in at ambient conditions, state A, and compressed at constant temperature to state B. The compressed air passes through a heat exchanger where the topping cycle exhaust heats it from state B to state C. The hot compressed air is then expanded, at constant entropy, to state D. With the proper compression ratio, state D and A are identical and all the available top cycle exhaust energy is converted to work.

The preceding discussion was based on ideal engines and real world engines have losses that prevent them from achieving the ideal performance. Nevertheless, it shows that the potential for a high efficiency bottom cycle engine is with an engine consisting of a cooled compressor (approximating isothermal compression), a recuperator for capturing top cycle heat, and an insulated expander (approximating constant entropy expansion).

U.S. Pat. No. 4,751,814 ("Air Cycle Thermodynamic Conversion System", Farrell, 1988) teaches a bottom cycle engine meeting the ideal characteristics just defined. It is a turbine based system that uses multi-stage compression with intercoolers to approximate the desired constant temperature (isothermal) compression process. The compressed gas is then heated in a heat exchanger to recover the top cycle exhaust heat and expanded through a turbine to produce the work to drive the compressor and to produce useful work for an outside process. This patent also teaches the importance of establishing the flows in both the top and bottom cycles so they both have "about equal heat capacities". An imbalance in the heat capacities underutilizes the heat in the higher heat capacity engine and wastes otherwise available energy.

Although Farrell's patent teaches the key thermodynamics for an ideal bottom cycle, it is a turbine based system. Such systems are viable for large powerplants but do not work well for smaller powerplants. Blade edge losses are difficult to control with smaller size turbines and the high turbine speed makes integration with the top engine shaft or electrical generators difficult. Also turbine engines cannot be built or maintained in small machine shops whereas reciprocating engines, particularly in micro-generation sizes, can easily be built and maintained in automotive machine shops.

U.S. Pat. Nos. 6,415,607; 6,301,891 and 6,216,426 (all titled "High Efficiency, Air Bottoming Engine" , Gray, Jr.; 2002, 2001 and 2001 respectively) teach substituting Farrell's turbine cycle with reciprocating components to meet the same thermodynamic objectives. Although avoiding the problems of small turbines, Gray substitutes a very complex multiple-cylinder reciprocating arrangement. Not only is this arrangement costly to manufacture and prone to breakdown, it greatly increases the surface area of the expander and makes it much more difficult to approach the ideal, constant entropy, (adiabatic) expansion process.

U.S. Pat. No. 4,333,424 ("Internal Combustion Engine", McFee, 1982) teaches a reciprocating top cycle engine consisting of a reciprocating compressor, insulated reciprocating expander, and a heat exchanger to recover the exhaust heat for preheating the compressor exit air. McFee makes use of much simpler compressor and expander geometry but is solving the problem of developing a new top cycle engine that combines the Brayton and Diesel cycles. McFee makes no mention of bottom cycle applications or how his engine could be integrated with a top cycle engine.

It is the primary aim of this invention to overcome the disadvantages of current bottom cycle engines discussed above and to achieve high rates of heat recovery from the top cycle, ease of integration with engines typical for distributed power generation, ease of control, long life, and economy of manufacture by implementing the several objects listed below.

OBJECTS OF THE INVENTION

It is an object of this invention to provide a simple, hot-air, bottom cycle engine that can be attached to any existing gas turbine, spark-ignition, Diesel or similar top cycle engine that provides a source of exhaust heat.

It is another object that the bottom cycle engine can be attached to the top cycle engine with very minor modification to the top cycle engine.

It is an additional object that the bottom cycle engine has an insignificant effect on either the efficiency or durability of the top cycle engine.

It is a still another object that the bottom cycle engine can be directly coupled mechanically to the top cycle engine so that the resulting combined cycle engine can be controlled by the existing top cycle engine controls.

It is also an object that the bottom cycle engine can be controlled independently from the top cycle engine by means of restricting the air into the bottom cycle and/or diverting the top cycle exhaust so that load following can be accomplished effectively and efficiently.

It is a further object that the bottom cycle engine can be made using already available engine blocks for most of the mechanical parts.

It is another object that it be possible to substitute some of the cylinders on a top cycle engine with bottom cycle compressor heads and/or expander heads and cylinder extenders to completely integrate the engines mechanically.

It is a further object that the bottom cycle engine can be made using commercially available compressors by mechanically connecting the compressor to the expander and/or the top cycle drive shaft(s).

It is also an object that the bottom cycle engine can be made by simple modifications to the expander cylinders of Afterburning Ericsson Cycle engines.

SUMMARY OF THE INVENTION

To implement the stated objects of the invention, a Reciprocating Hot Air Bottom Cycle Engine has been devised. The principal feature of the bottom cycle engine is its ability to approximate the ideal bottom cycle engine while being possible to construct with essentially the same methods, materials, and tools used to build conventional spark-ignition engines. The engine consists of a cooled compressor, an exhaust gas recuperator, and an insulated expander.

The compressor uses conventional air compressor technology to compress the bottom cycle air in an approximation to isothermal compression. In its simplest form, a single stage air or water-cooled reciprocating compressor can be used. Alternatively, staged compressors with inter-cooling can provide an even closer approximation to isothermal compression, although with higher manufacturing cost. Another alternative is to use rotary, Roots-blower, compressors that are simpler but less efficient. In all cases, the mechanical power to drive the compressor is obtained by mechanical connection (belt, shaft, gears etc.) to either the top cycle engine or bottom cycle expander.

The recuperator is the high effectiveness, low pressure loss, counterflow heat exchanger that recovers the exhaust heat from the top cycle and transfers it to the bottom cycle. The recuperator is identical to the recuperators used for recuperated gas turbine cycles. An excellent recuperator for this application is the Annular Flow Concentric Tube Recuperator of my U.S. Pat. No. 6,390,185.

Expanding the hot compressed gas in the expander produces the gross mechanical work of the bottom cycle engine. The expander is identical to the expander of an Afterburning Ericsson Cycle engine that has been simplified by removing the heat exchanger passages. The similarity allows both types of engines to be built in the same production line or even for simple modification from one to another in the field.

Maximum utilization of the top cycle exhaust energy is obtained by balancing the flows so that the heat capacity flowrate of both the top and bottom cycle are nearly identical. For this reason, the top and bottom engines should be matched so that they both have the same flowrates at the optimal design point. If the top and bottom cycle engines operate at the same speed, this is accomplished by simply having the total displacement of the bottom cycle compressor(s) equal to the total displacement of the top cycle engine.

The preferred means of controlling the bottom cycle engine is to mechanically couple the crankshafts of the top cycle engine and bottom cycle expander. By this means the resulting combined cycle engine can be controlled using the existing top cycle engine controls. A mechanical coupling also eliminates a means for starting the bottom cycle engine since it can be cranked by the top cycle engine, either directly by the top cycle start motor, or by engaging a clutch after the top cycle engine has started. Mechanical coupling also eliminates the need for a flywheel on the bottom cycle engine.

If it is impractical to mechanically couple the engines, the bottom cycle can be controlled by controlling the air flow and/or bypassing the top cycle exhaust flow to more closely adjust the bottom cycle output to the load demand.

A number of distinct advantages of the Reciprocating Hot Air Bottom Cycle Engine can be listed:

1. The engine provides a simple, "bolt-on", means for increasing the power of existing engines with insignificant increase in fuel consumption.

2. The engine can be adapted to a wide range of top cycle engines including, but not limited to, gas turbine, spark-ignition, Diesel and even Fuel Cell powerplants.

3. Unlike a turbocharger, the bottom cycle engine can significantly increase the fuel efficiency of a spark-ignition engine because there is no need to "detune" to avoid pre-ignition and detonation. This is a very important advantage to fully utilizing the potential of natural gas fuel in spark-ignition engines.

4. Unlike a turbocharger, the bottom cycle engine does not increase engine temperatures or stresses for the top cycle engine.

5. All moving parts are exposed only to clean air rather than combustion products that can limit life and performance from carbon buildup or chemical reactions.

6. The engine can be controlled independently from the top cycle engine by means of conventional throttle valves and exhaust bypass valves.

7. The sound output of the combined cycle engine is as low or lower than the original top cycle engine alone. Removing the top cycle exhaust energy through the recuperator also lowers the sound energy. The bottom cycle engine has a low exhaust pressure that does not produce an internal combustion engine's "bark" when the exhaust valve opens.

BRIEF DESCRIPTION OF THE DRAWINGS

A better understanding of the invention may be gained by reference to the following Detailed Description in conjunction with the drawings provided in which.

REFERENCE NUMBERS IN FIGS. 6 & 7

- 1 Compressor Assembly
  - 1A Inlet Valve
  - 1B Exhaust Valve
  - 1C Piston
  - 1D Connecting Rod
  - 1E Cooling Fins
  - 1F WaterJacket
  - 1G Outlet Tube
- 2 Expander Assembly
  - 2A Inlet Valve
  - 2B Exhaust Valve
  - 2C Exhaust Tube
  - 2D Piston
  - 2E Piston Insulating Extender
  - 2F Piston Rings
  - 2G Connecting Rod
  - 2H Cooling Fins
  - 2I Water Jacket
  - 2J Insulation
- 3 Recuperator
  - 3A High Pressure Outlet
  - 3B Top Cycle Exhaust Inlet Tube
  - 3C Top Cycle Exhaust Outlet Tube
- 4 Crank
- 5 Air Filter
- 6 Throttle
- 7 Compressor Cooling Blower
- 8 Blower Drive Belt

DETAILED DESCRIPTION OF THE PREFERRED EMBODIMENTS

Reciprocating Hot Air Bottom Cycle Engine Characteristics

Figure 1:
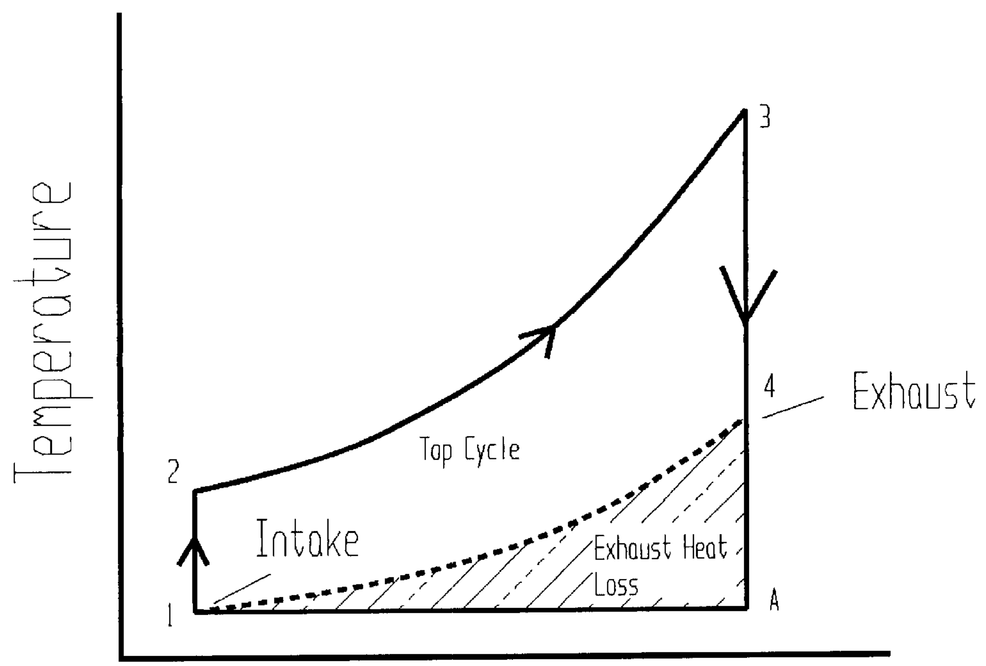
FIG. 1 is a temperature-entropy diagram of a top engine cycle with the shaded area representing the potential for mechanical work that is lost in the exhaust heat (described in the BACKGROUND OF THE INVENTION section).
Figure 2:
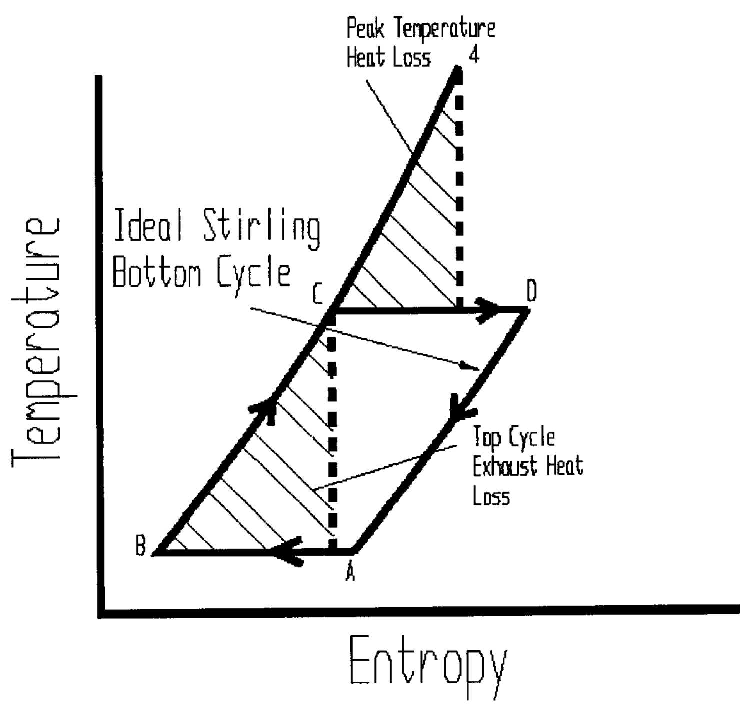
FIG. 2 is a temperature-entropy diagram of a Stirling cycle engine using the top cycle exhaust heat with shaded areas representing the potential for mechanical work that can not be recovered by a Stirling cycle bottom engine (described in the BACKGROUND OF THE INVENTION section).
Figure 3:
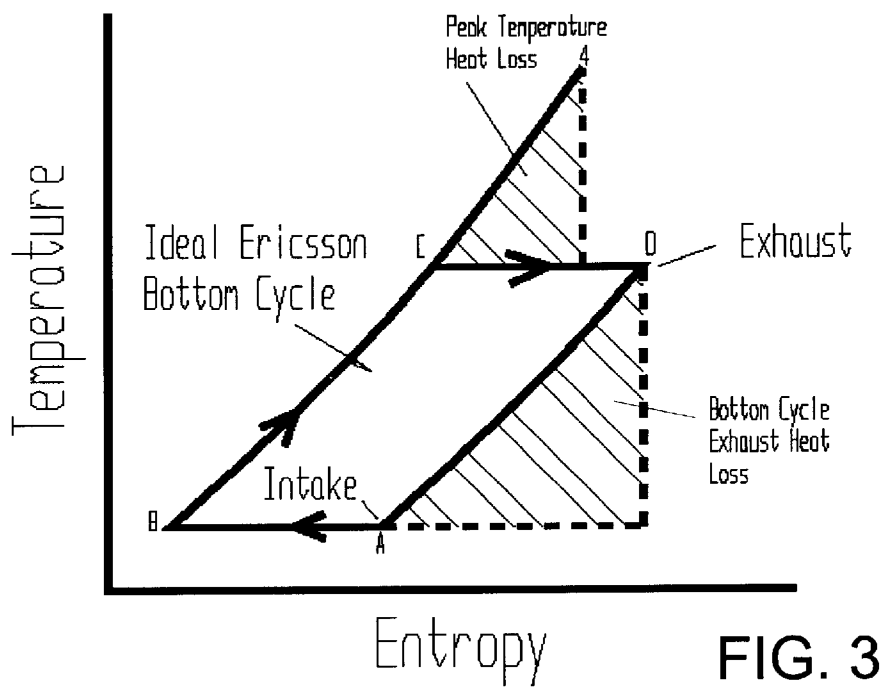
FIG. 3 is a temperature-entropy diagram of an Ericsson cycle engine using the top cycle exhaust heat with shaded areas representing the potential for mechanical work that can not be recovered by an Ericsson cycle bottom engine (described in the BACKGROUND OF THE INVENTION section).
Figure 4:
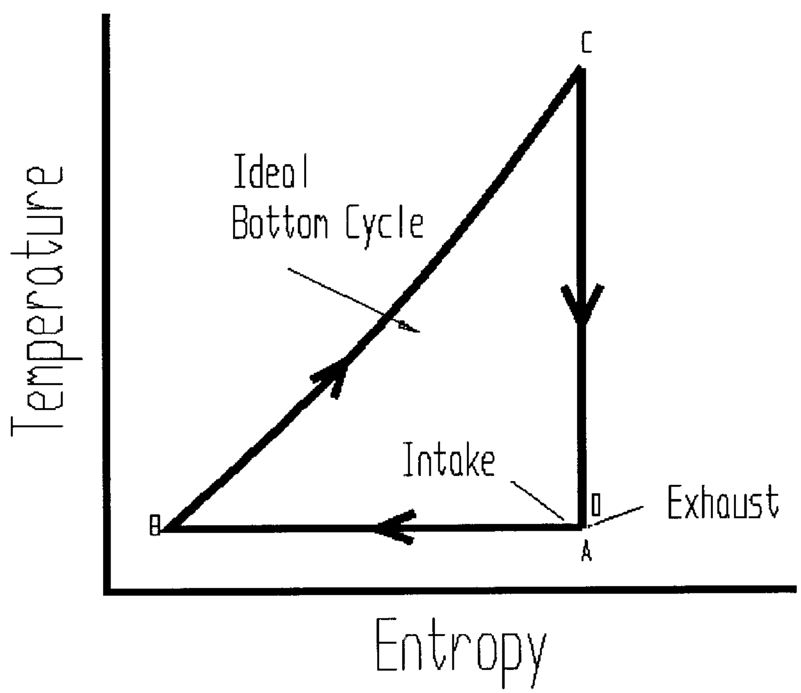
FIG. 4 is a temperature-entropy diagram of an ideal bottom cycle engine showing that all the potential for mechanical work has been recovered (described in the BACKGROUND OF THE INVENTION section).
Figure 5:
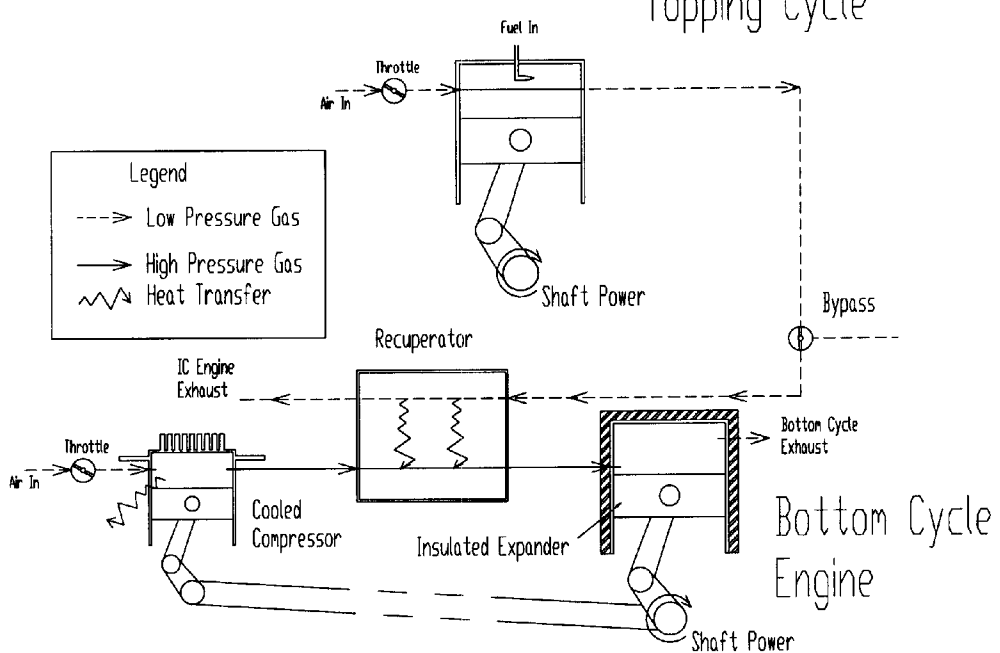
FIG. 5 is a block diagram of the Reciprocating Hot Air Bottom Cycle Engine utilizing an internal combustion engine as the top cycle.

FIG. 5 is a functional block diagram of the Reciprocating Hot Air Bottom Cycle engine. A top cycle engine produces shaft power and also produces the hot exhaust gas that passes through the counterflow heat exchanger (recuperator) to transfer its heat to the bottom cycle engine. In the bottom cycle, ambient air is compressed by a compressor and then heated in the recuperator to gain heat energy before expanding in an expander to produce work. The expansion of the hot air in the expander produces more work than is required to compress the cooled air in the compressor so net work is available for an outside process. The compressor is cooled by air or water to reduce that compression work and the expander is insulated to allow it to utilize nearly all of the energy gained in the recuperator to produce the expansion work. The power output of the bottom cycle engine can be controlled independently of the top cycle engine by using a throttle to reduce the flow of air through the bottom cycle and/or a bypass to dump the top cycle exhaust before it passes through the recuperator.

Figure 6:
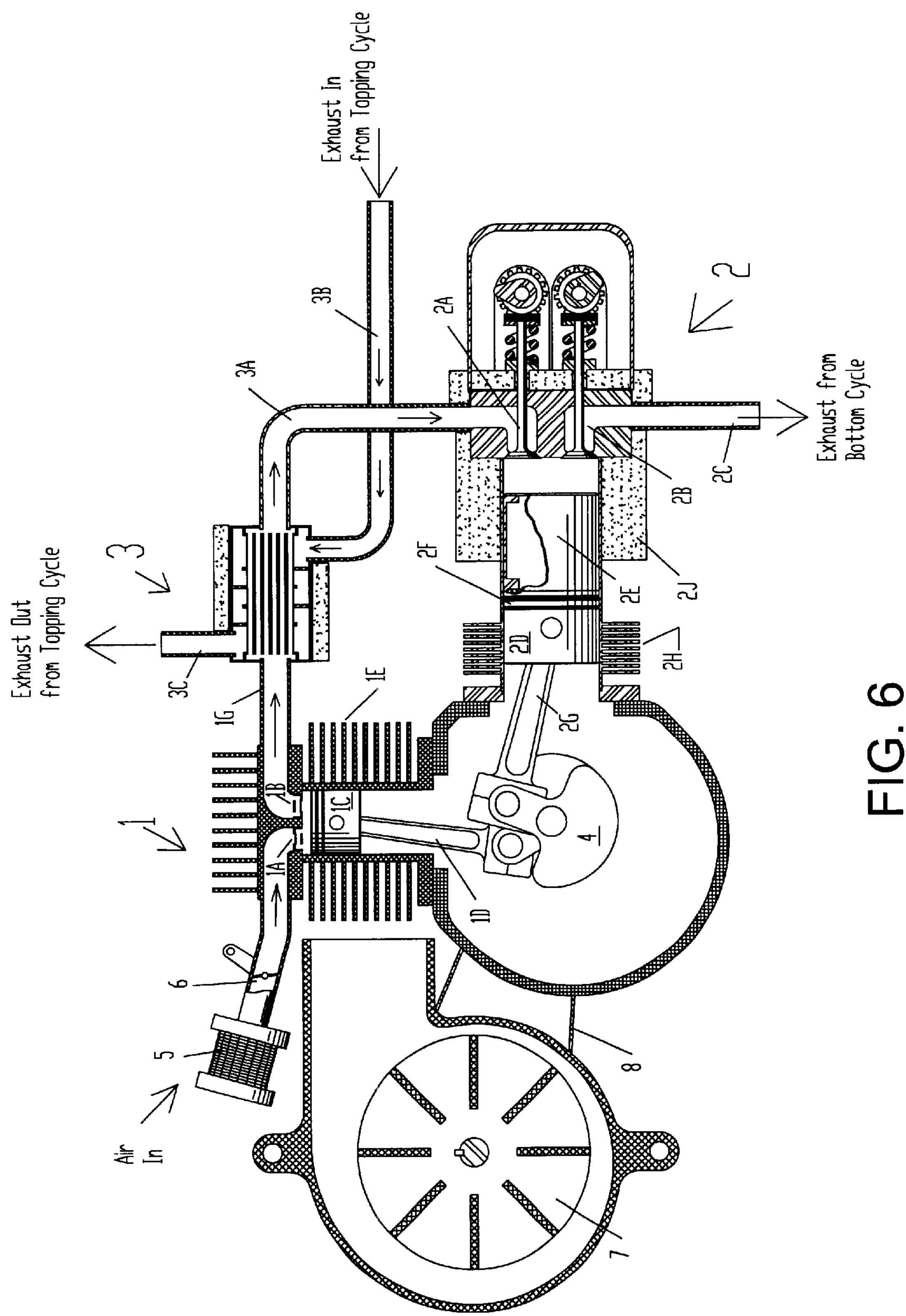
FIG. 6 is a cross section of an air cooled Reciprocating Hot Air Bottom Cycle Engine.

FIG. 6 shows a cross section of an air-cooled embodiment of the Reciprocating Hot Air Bottom Cycle Engine. The top cycle exhaust heat enters the engine through the top cycle exhaust inlet tube 3B and passes through the low pressure passages of the recuperator 3 where it is cooled in counter-flow with the incoming compressed air coming from the compressor through outlet tube 1G. The cooled exhaust then exits the recuperator through the top cycle exhaust outlet tube 3C. The exhaust cooling and the recuperator baffle effect should eliminate the need for any other muffler for the top cycle engine in most cases.

Ambient air enters the engine through an air filter 5 and passes through the optional throttle 6 that can be used to control the amount of air entering the engine. The air then enters the compressor assembly 1 through the inlet check valve 1A. After being compressed by the piston 1C the air exits through the exhaust check valve 1B. Cooling fins on the compressor 1E remove most of the compression heating to reduce the amount of mechanical work required from the crank 4 through the connecting rod 1D. In this air-cooled embodiment, a compressor cooling blower 7 driven by a blower drive belt 8 provides cooling air.

The air is transferred to the recuperator 3 after leaving the compressor assembly 1 through the outlet tube 1G and is heated by the top cycle exhaust gases. The hot compressed air then exits through the high pressure outlet tube 3A to the expander assembly 2.

The recuperator 3 can be any suitable high effectiveness, low pressure drop, counterflow heat exchanger that is suitable for the pressures and temperatures. The Proe 90™ gas turbine recuperator (U.S. Pat. No. 6,390,185) was originally developed for Afterburning Ericsson Engine requirements and is an ideal recuperator for this application as well.

The hot compressed air passes through the expander inlet valve 2A and expands to force the piston assembly 2D downward. The downward motion is transmitted to the crank 4 through the connecting rod 2G. The inlet valve 2A closes after piston 2D is only part way down its stroke so that the initial air volume can fully expand and produce work. The pressure ratio of the bottom cycle engine is set by the timing of this intake valve cutoff combined with the geometry of the cylinders in the compressor assembly 1 and expander assembly 2.

After the expander piston 2D reaches bottom dead center, the expander exhaust valve 2B opens and remains open until the piston 2D moves to top dead center. The exhaust exits the engine through exhaust tube 2C.

The expander incorporates several heat management devices to both retain heat in the air and to protect the piston rings 2F from high temperatures. High performance insulation 2J such as Refrasil is applied to the outside of the expander cylinder assembly 2 in all the areas where the expander structure is exposed to the hot air. Heat loss through conduction down the piston is minimized by a thin high-temperature extension 2E in the same manner as the pistons on an Afterburning Ericsson Cycle engine. Heat loss is through conduction along the cylinder is also reduced by the corresponding increased length of the expander cylinder. Cooling fins 2H at the base of the expander cylinder further assure that the piston rings 2J remain at temperatures consistent with long life with conventional lubrication by removing the small amount of heat conducted through the piston extension 2E and the cylinder wall. The valves 2A and 2B are also the same type of ceramic (or other high temperature material) valves as used on an Afterburning Ericsson Cycle Engine.

Figure 7:
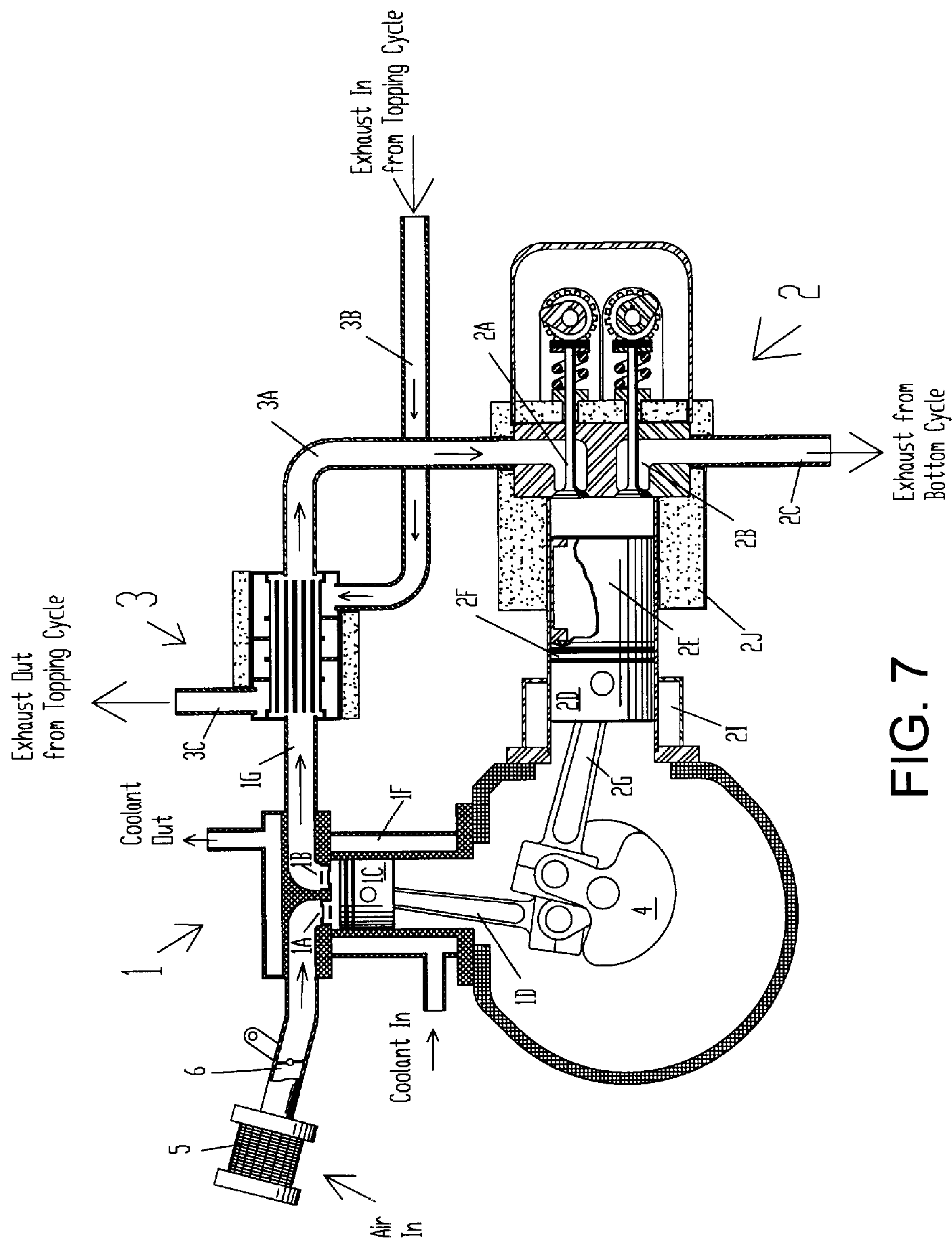
FIG. 7 is a cross section of a water cooled Reciprocating Hot Air Bottom Cycle Engine.

FIG. 7 shows a cross section of a water-cooled embodiment of the Reciprocating Hot Air Bottom Cycle Engine. The operation and most parts are the same as an air-cooled embodiment. The compressor cooling fins are replaced by a water jacket 1F and the expander assembly cooling fins are also replaced with a water jacket 21. Usual automotive coolants can be used for cooling since the temperatures of both the compressor and expander base are low. Ideally, the coolant is obtained from the top cycle engine, otherwise the bottom cycle engine requires its own waterpump, radiator and cooling fan. Since maximum heat removal from the compressor is the object, no thermostat is necessary. Passing the coolant through the compressor water jacket 1F and then the expander water jacket 2F is the preferred method since it assures minimum coolant temperature to the compressor.

Figure 8:
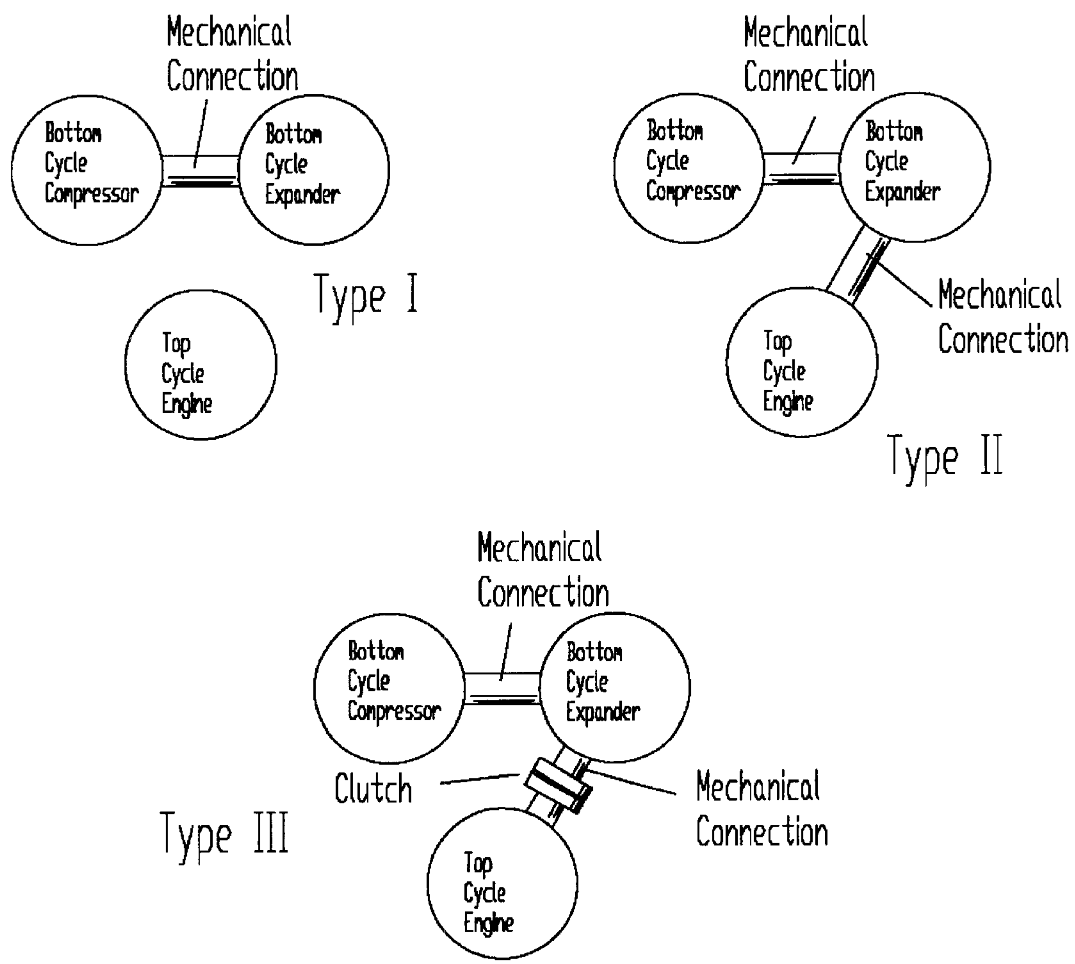
FIG. 8 shows the different options for mechanically coupling a top cycle engine with a Reciprocating Hot Air Bottom Cycle Engine.

FIG. 8 shows the three methods for mechanically coupling the top and bottom cycles to make a combined cycle engine. In a Type I connection there is no mechanical connection between the bottom cycle engine and the top cycle engine. Work is provided to the load or loads through separate mechanical connections to the crankshafts of the top and bottom cycle engines respectively. A Type I connection is preferred for gas turbine engines because the large difference in rotational speeds makes any form of mechanical connection impractical. This configuration also best meets the object of minimal modification to the top cycle engine. The bottom cycle engine is simply connected to the top cycle engine by the top cycle exhaust inlet tube (3B in FIGS. 6 and 7). The combined cycle is started by first starting the top cycle engine and then waiting a short period for the recuperator to warm. The bottom cycle engine then only needs a slight crank by a small starter motor for it to start by itself. Load following can then be managed by the throttle and/or exhaust bypass shown in FIGS. 4 through 7.

The Type II connection requires mechanically connecting the crankshaft of the bottom cycle engine to the shaft of the top cycle, either directly or through a gear or sprocket ratio. Although it requires additional modification to the top cycle engine, it simplifies the combined cycle by eliminating the need for a bottom cycle throttle, an exhaust bypass, a bottom cycle starting mechanism and a bottom cycle engine flywheel. (Also, since there is no throttle pressure drop and no exhaust waste through a bypass, the bottom cycle engine can be controlled without an efficiency penalty.) The top cycle engine is started and the bottom cycle engine rotates at the same time. While the recuperator is warming, the bottom cycle engine is a load on the top cycle. However, as the recuperator warms, the bottom cycle changes from a load to a source of shaft power. The combined cycle is then controlled with the throttle or fuel control on the top cycle engine.

The Type III connection is a slight modification to Type II. A clutch allows the top cycle engine to start without the additional cranking load of the bottom engine. Once the recuperator is warm, the clutch is engaged, the top engine cranks the bottom cycle engine and the bottom cycle instantly provides additional power. The clutch can be disengaged for maintenance of the bottom cycle engine while the top cycle engine continues to run.

Figure 9:
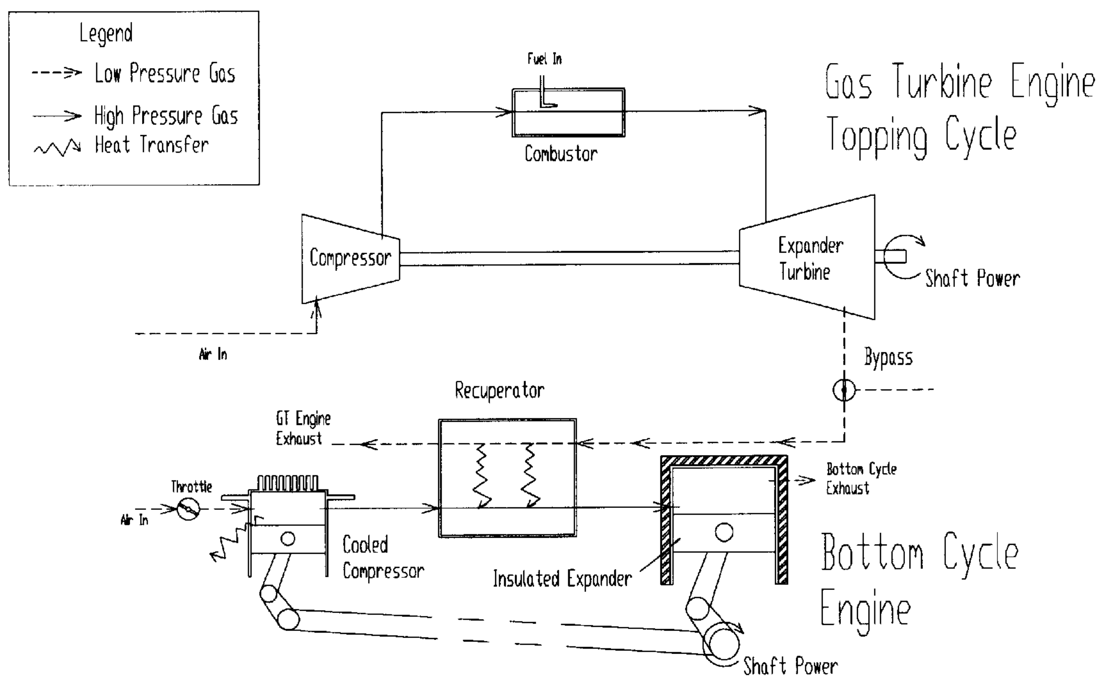
FIG. 9 shows a block diagram of the Reciprocating Hot Air Bottom Cycle Engine utilizing a gas turbine engine as the top cycle.

FIG. 9 shows a functional block diagram of the Reciprocating Hot Air Bottom Cycle Engine utilizing a gas turbine engine as the top cycle.

Although a simple air or water cooled reciprocating compressor is a very simple and effective means for compressing the air in a Reciprocating Hot Air Bottom Cycle Engine, other alternatives have advantages and disadvantages worth considering.

More effective cooling and lower compression power loss can be achieved by using staged inter-cooled reciprocating compressors. In most cases the slight performance gain is offset by increased initial cost but some market conditions could justify the additional cost.

Figure 10:
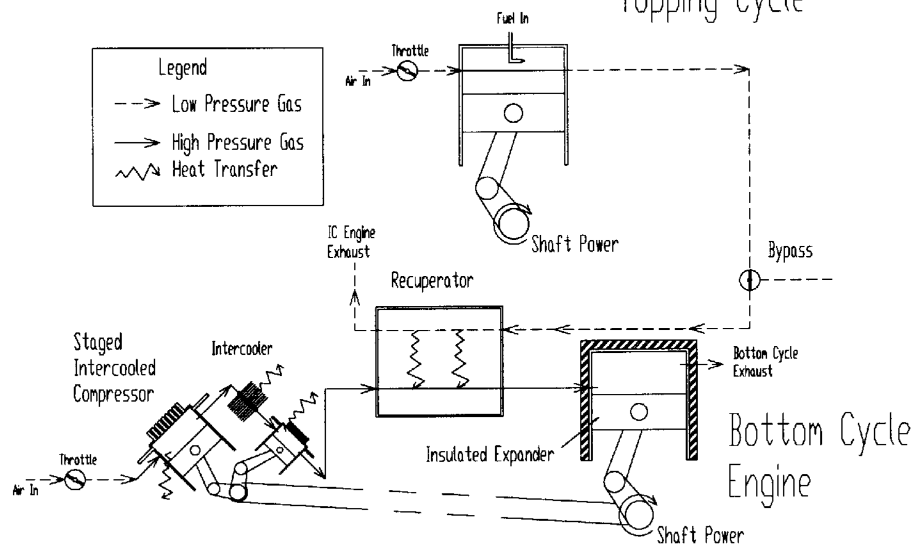
FIG. 10 shows a block diagram of the Reciprocating Hot Air Bottom Cycle Engine with a staged inter-cooled reciprocating compressor utilizing an internal combustion engine as the top cycle.

FIG. 10 shows a block diagram of the Reciprocating Hot Air Bottom Cycle Engine with a staged inter-cooled reciprocating compressor utilizing an internal combustion engine as the top cycle.

Figure 11:
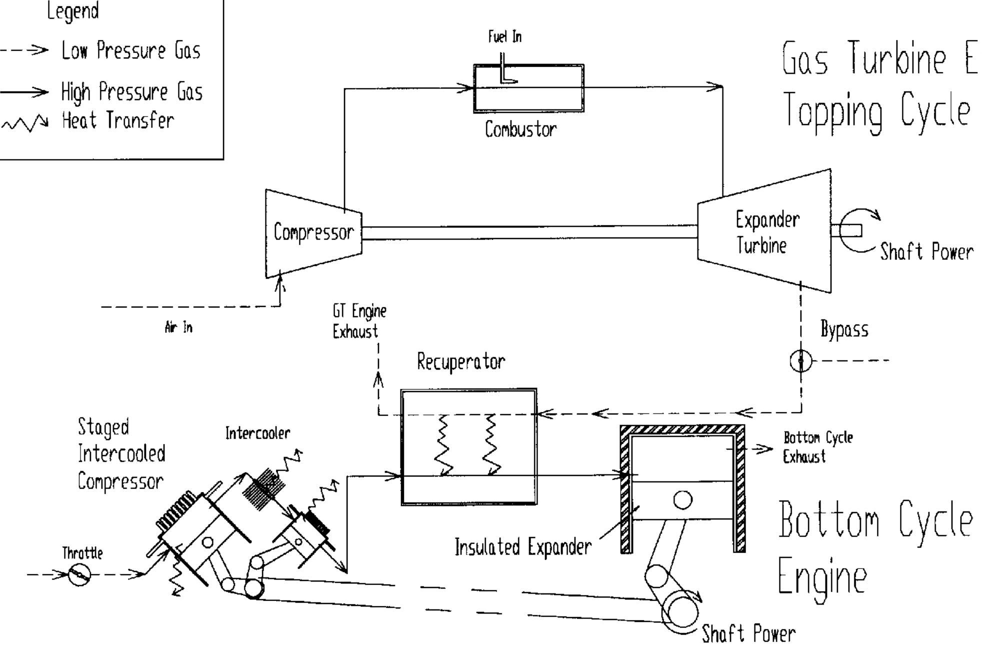
FIG. 11 shows a block diagram of the Reciprocating Hot Air Bottom Cycle Engine with a staged inter-cooled reciprocating compressor utilizing a gas turbine engine as the top cycle.

FIG. 11 shows a block diagram of the Reciprocating Hot Air Bottom Cycle Engine with a staged inter-cooled reciprocating compressor utilizing a gas turbine engine as the top cycle.

Another compressor alternative is to use a rotating positive displacement compressor such as a Roots blower or scroll compressor. The cooling is not as effective with these compressors and they have flow leakage that reduces efficiency. However, their smaller size could offset those penalties.

Figure 12:
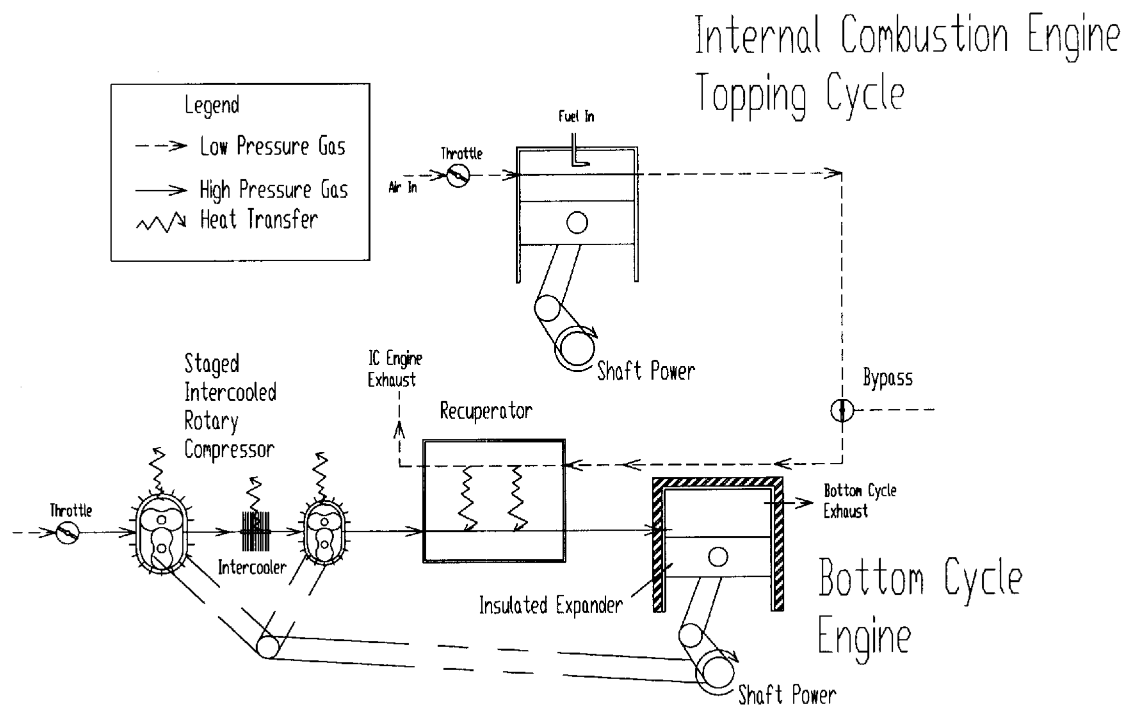
FIG. 12 shows a block diagram of the Reciprocating Hot Air Bottom Cycle Engine with a staged inter-cooled rotary compressor utilizing an internal combustion engine as the top cycle.

FIG. 12 shows a block diagram of the Reciprocating Hot Air Bottom Cycle Engine with a staged inter-cooled rotary compressor utilizing an internal combustion engine as the top cycle.

Figure 13:
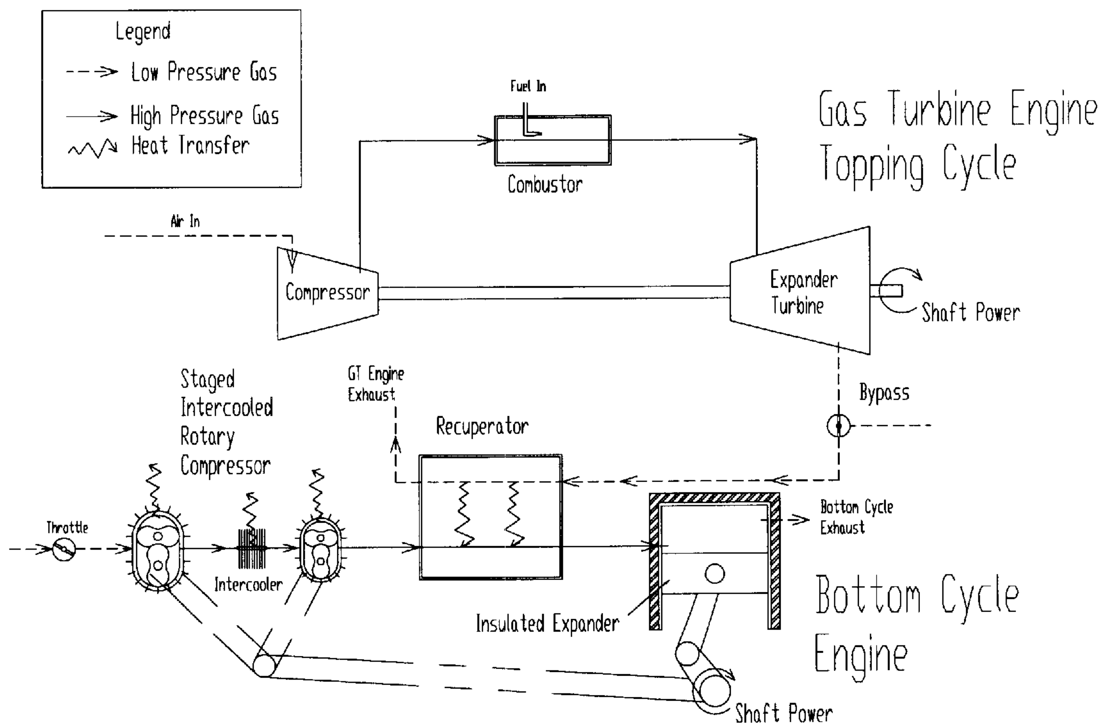
FIG. 13 shows a block diagram of the Reciprocating Hot Air Bottom Cycle Engine with a staged inter-cooled rotary compressor utilizing a gas turbine engine as the top cycle.

FIG. 13 shows a block diagram of the Reciprocating Hot Air Bottom Cycle Engine with a staged inter-cooled rotary compressor utilizing a gas turbine engine as the top cycle.

Engine Operation

It is important that the pressure of the air entering the expander be essentially the same as the pressure of the air exiting the compressor. Otherwise, work done to pressurize the air is not used in pushing the expander piston and it is wasted. In most cases the volume of the high pressure passages and manifolds in the recuperator is significantly larger than the volume of the expander cylinder when the piston is at the cutoff position. In this case, the relative crank geometry between the compressor and expander is not critical. Multiple expander and compressor cylinders with equally spaced crank angles also reduce pressure variation. Nevertheless, if the engine is properly timed, the problem can be avoided. Proper timing is has compressor exhaust valve just open when the expander piston is at top dead center. The compressor piston is at then at the inlet valve cutoff point when the compressor piston is at top dead center. (Slight modifications to this approach to take advantage of air momentum in the valve ports could alter the exact timing, but the objective is the same.)

The crank angle sequence for a single compressor cylinder and single expander cylinder are shown in FIGS. 14 through 20.

Figure 14:
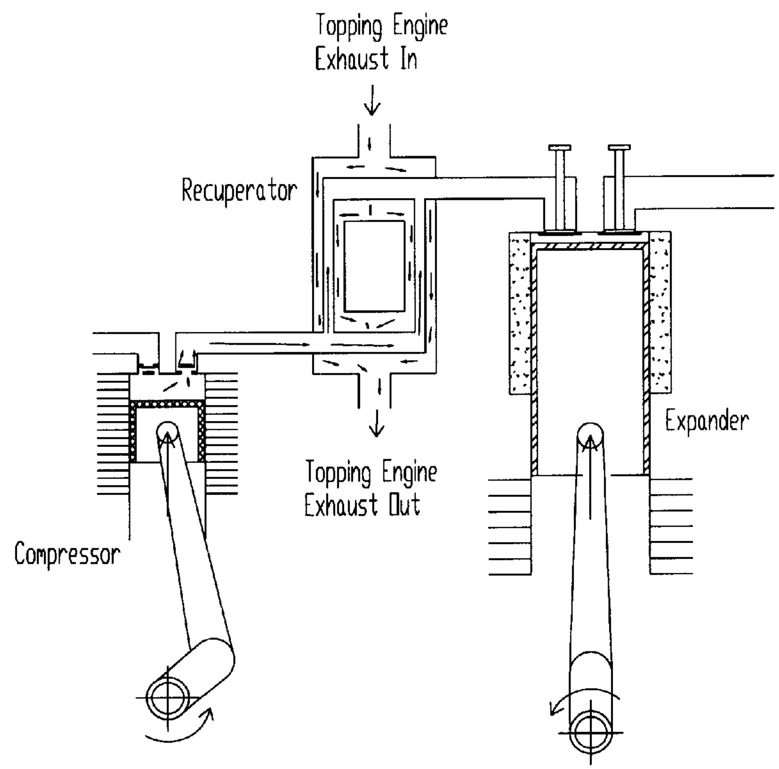
FIGS. 14 through 20 are schematics of a Reciprocating Hot Air Bottom Cycle Engine in a single compressor/single expander cylinder embodiment with synchronized pistons shown at successive crank angle positions during the complete cycle.

FIG. 14 shows the expander piston at top dead center with the compressor just starting to expel compressed air.

Figure 15:
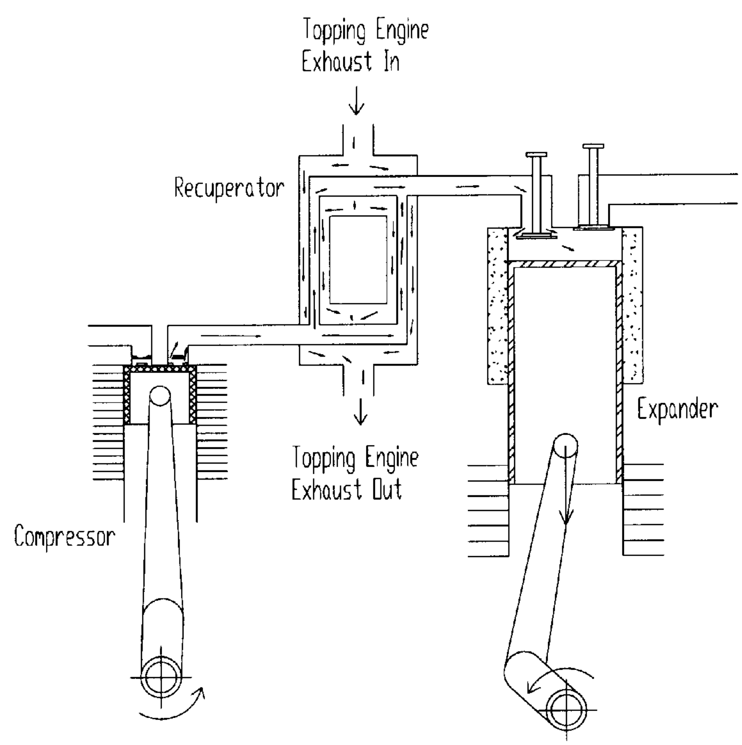

FIG. 15 shows the expander piston at the intake valve cutoff point and the compressor piston near top dead center and about to complete expelling compressed air. Between FIG. 14 and FIG. 15 the high pressure air has been flowing from the compressor to the expander through an unrestricted passage with both the compressor exhaust valve 1B in FIGS. 6 and 7 and the expander inlet valve 2A in FIGS. 6 and 7 open. As intended, with the exception of flow pressure loss, the pressure between the compressor and expander is constant. The pressure at this time is determined by the compressor displacement and the volume above the expander piston at the cutoff point shown in FIG. 15 and is the engine pressure ratio.

Figure 16:
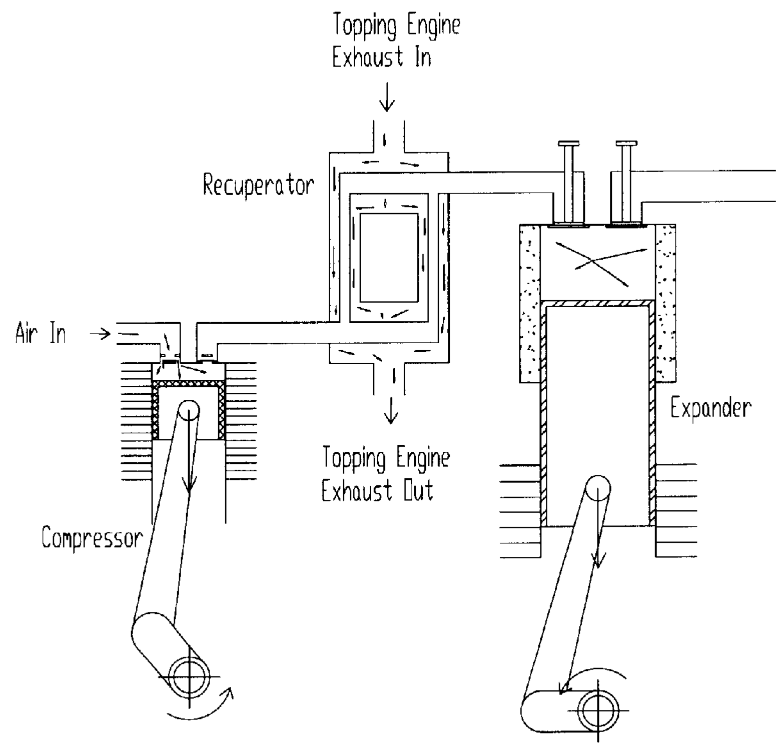

FIG. 16 shows the expander piston moving downwards with all valves closed while the compressor piston is moving downwards with the intake valve open. At this point the compressor is filling and the air in the expander is undergoing an approximately isentropic expansion from the pressure at FIG. 15.

Figure 17:
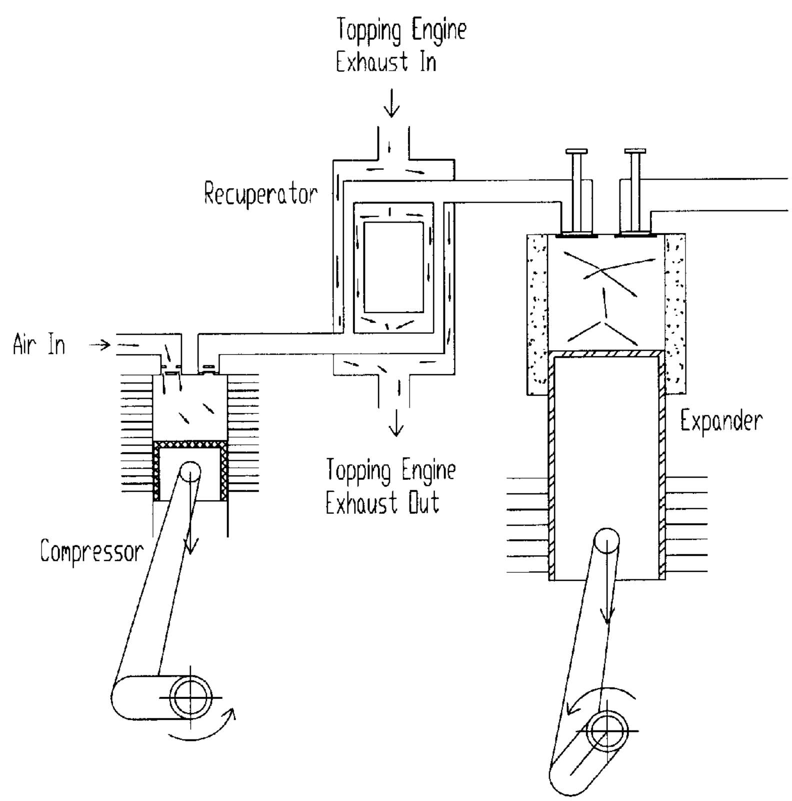

FIG. 17 is the same as FIG. 16 but with an additional 45 degrees of crank rotation.

Figure 18:
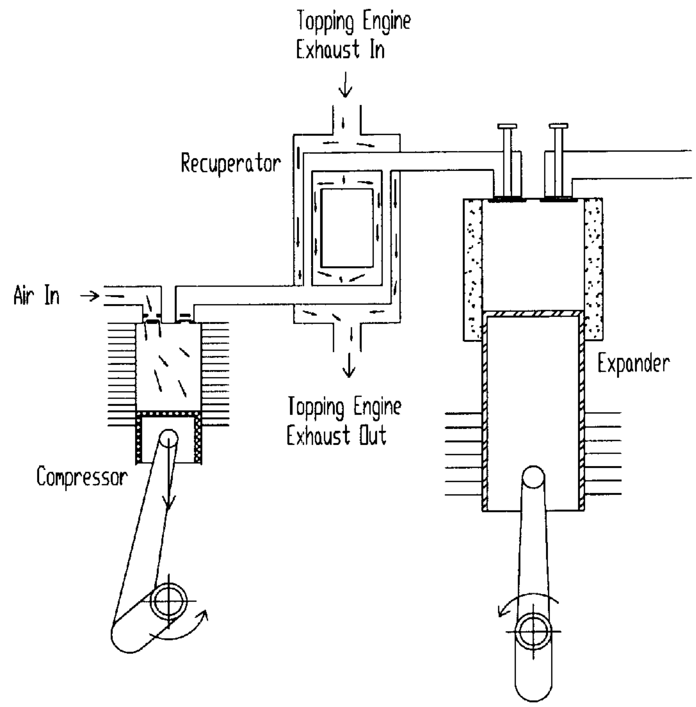

FIG. 18 shows the expander piston at bottom dead center and the compressor piston still on the intake stroke. The pressure in the expander is now very close to atmospheric.

Figure 19:
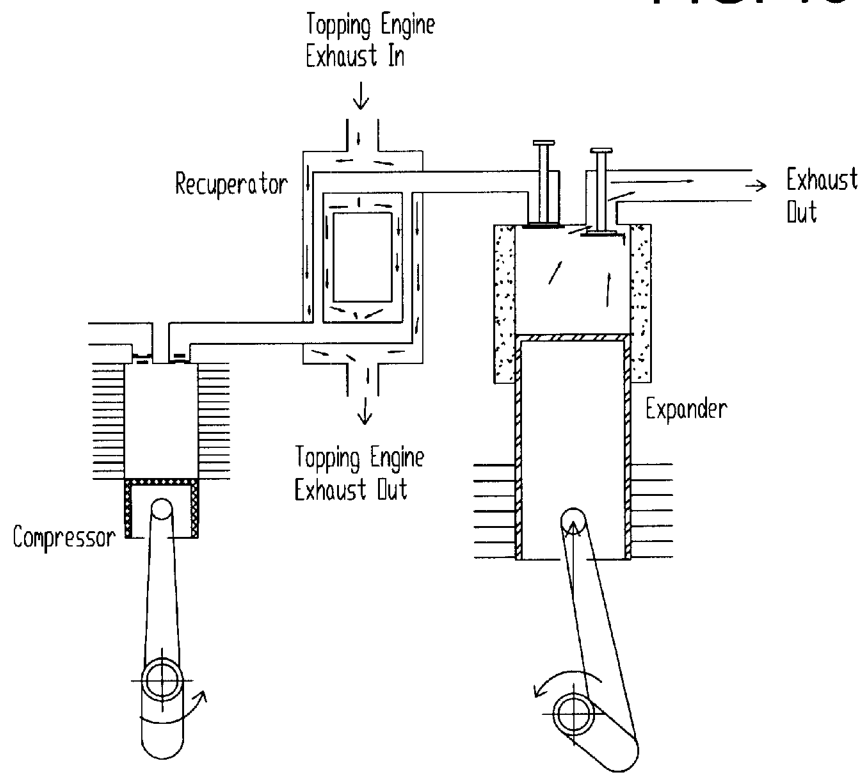

FIG. 19 shows the compressor piston at bottom dead center and the expander piston on the exhaust stroke with the expander exhaust valve open.

Figure 20:
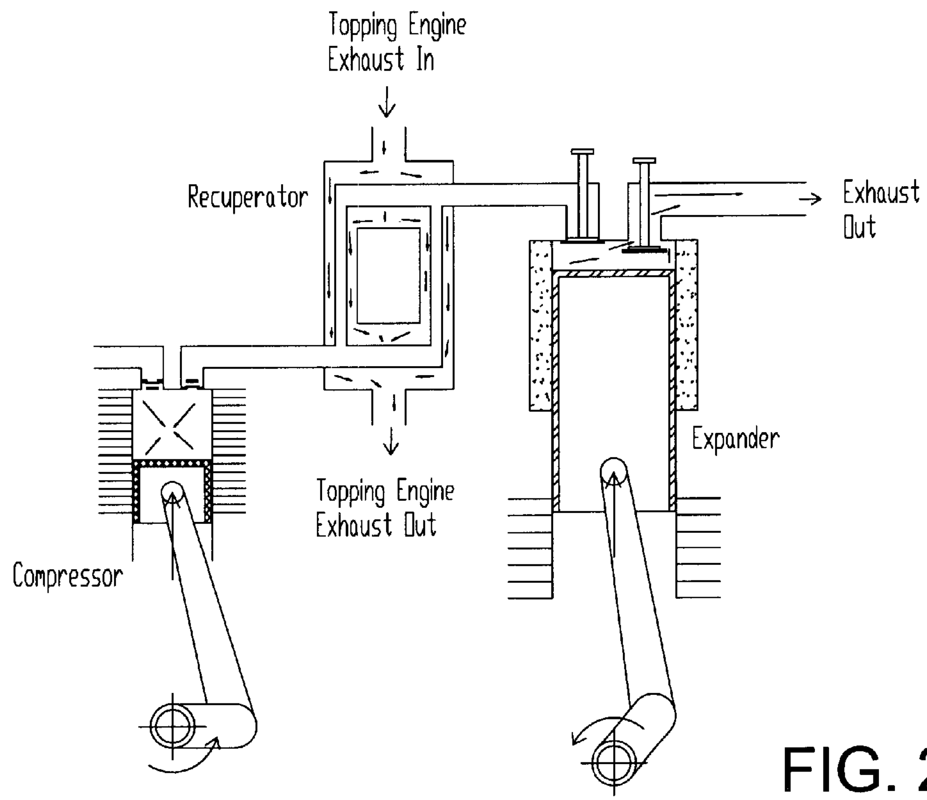

FIG. 20 shows the compressor compressing the air prior to its exhaust valve opening and the expander just finishing the exhaust stroke. Because the compressor valves are check valves, the compressor exhaust valve will not open until the air in the compressor has been compressed to the pressure level of the recuperator. Once that pressure is reached, the valve opens automatically and the cycle begins again at the point depicted in FIG. 14.

When the high pressure volume in the recuperator is more than 20 times the cutoff volume of the expander (a typical situation) better engine balance and simpler crank manufacture can be obtained by using a more conventional crank arrangement than depicted in FIGS. 14 through 20. With multiple cylinders the pressure variation also diminishes and equal crank angles are preferred. A matched set of a compressor cylinder and expander cylinder with 180 degree crank offset is depicted FIGS. 21 through 26.

Figure 21:
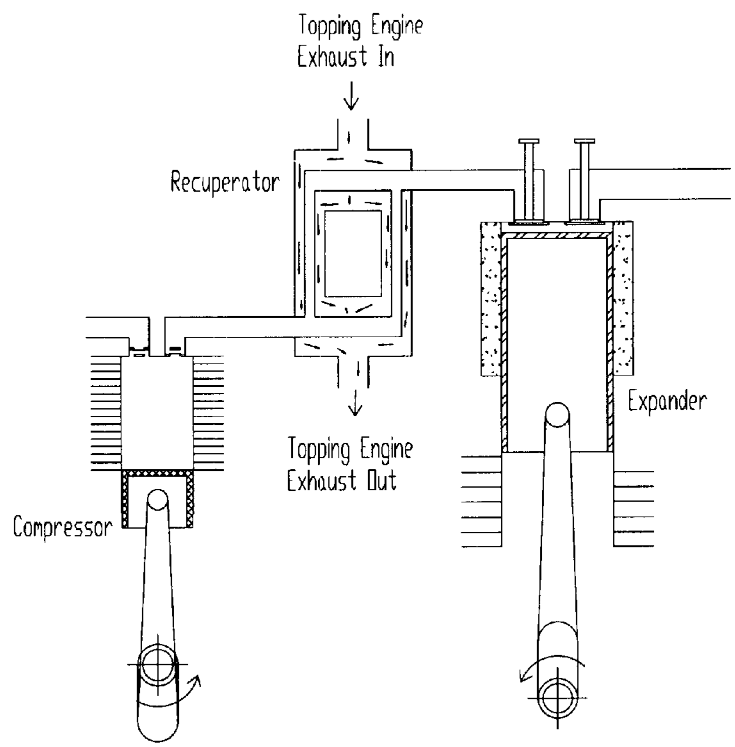
FIGS. 21–26 are schematics of a Reciprocating Hot Air Bottom Cycle Engine in a single compressor/single expander cylinder embodiment where the recuperator high pressure volume is much larger than the expander cutoff volume or a compressor/expander set when part of a multi-cylinder compressor/expander embodiment with synchronized pistons shown at successive crank angle positions during the complete cycle.

FIG. 21 shows the compressor piston at bottom dead center and the expander at top dead center with all valves closed.

Figure 22:
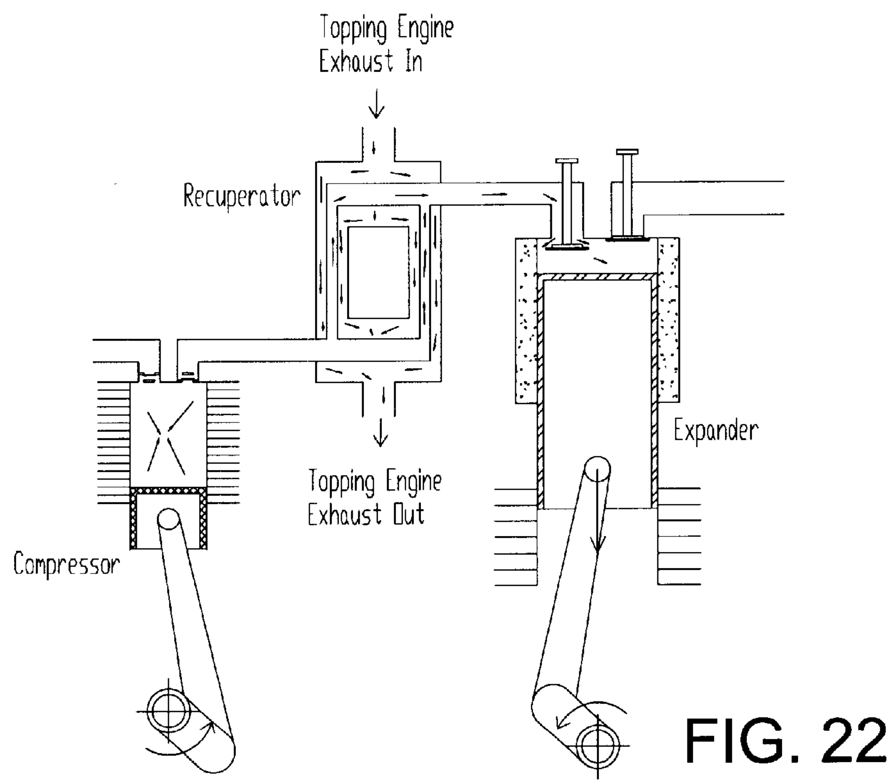

FIG. 22 shows the compressor piston compressing the air prior to its exhaust valve opening and the expander filling with compressed air through its intake valve. At this point, the expander filling is reducing the pressure in the recuperator below its nominal value. Nevertheless, if the recuperator volume is sufficiently large, the reduction can be acceptably small.

Figure 23:
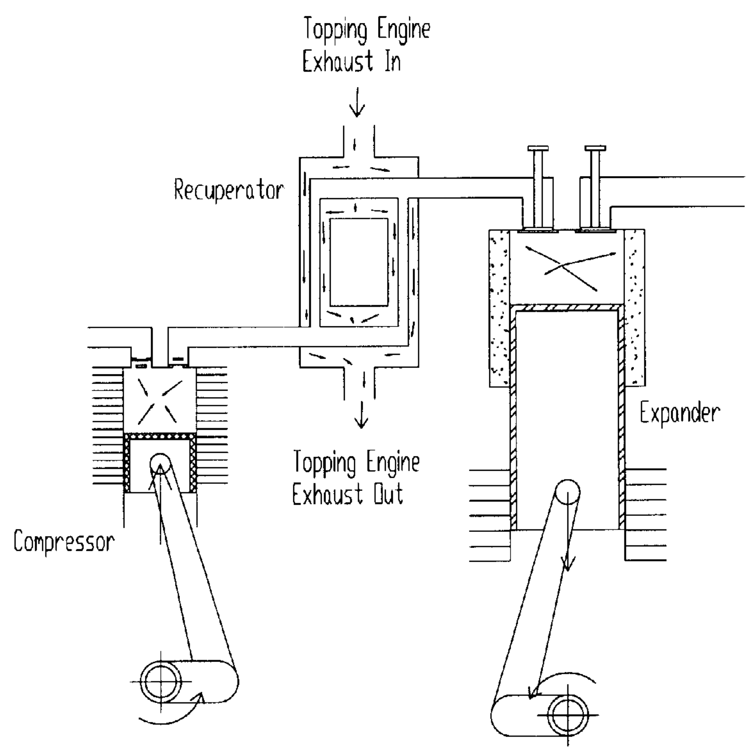

FIG. 23 shows the expander after cutoff with the expander intake valve closed and the compressor still compressing.

Figure 24:
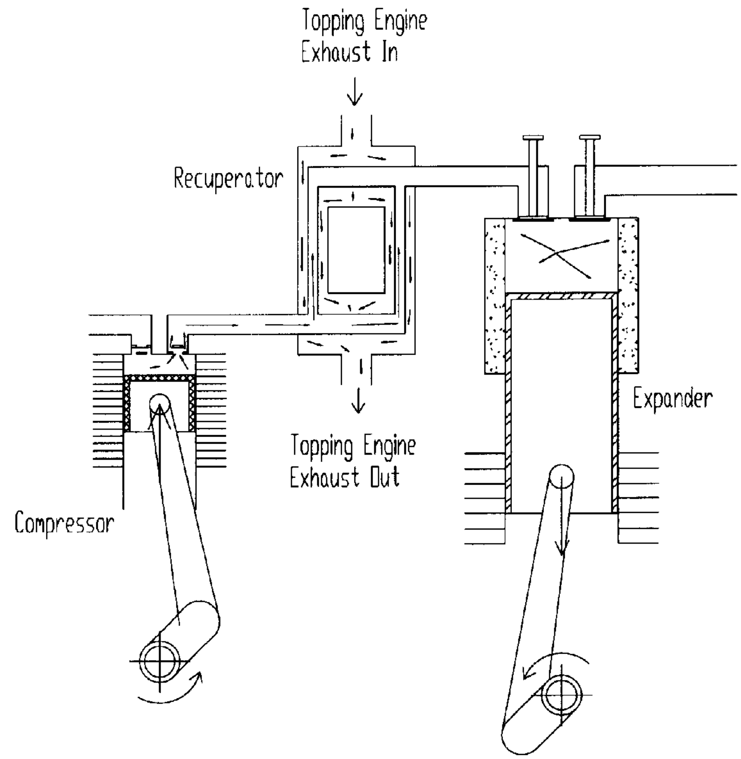

FIG. 24 shows the compressor after its exhaust valve opens and the expander piston still moving downward with all valves closed. At this point, the compressor is pressurizing the recuperator volume above its nominal value.

Figure 25:
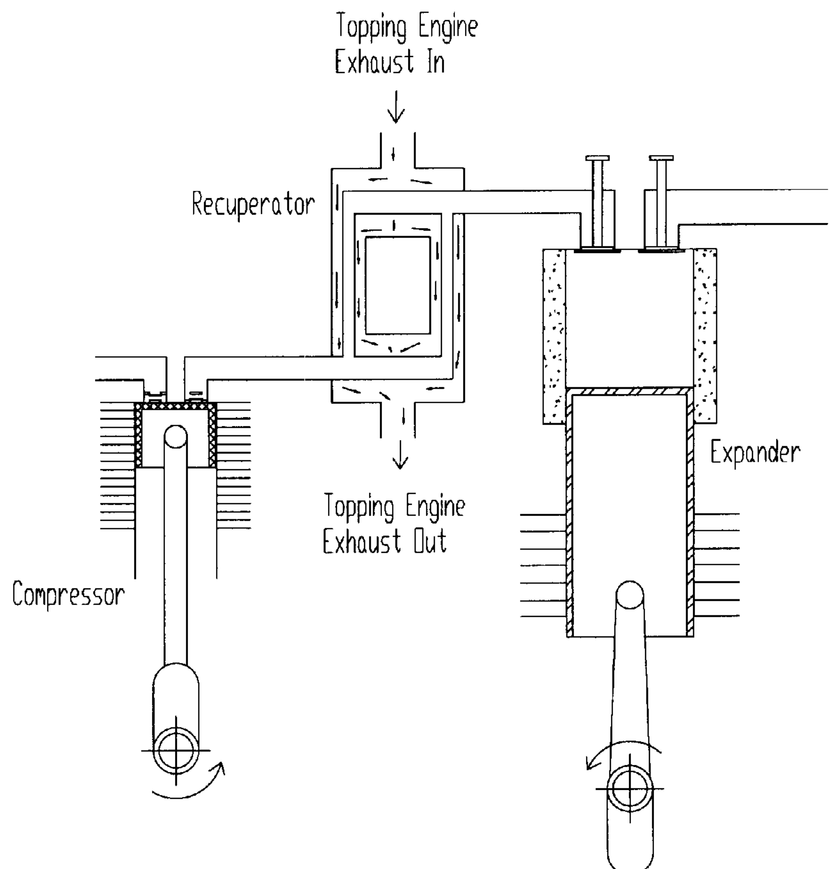

FIG. 25 shows the compressor piston at top dead center and the expander piston at bottom dead center with all valves closed.

Figure 26:
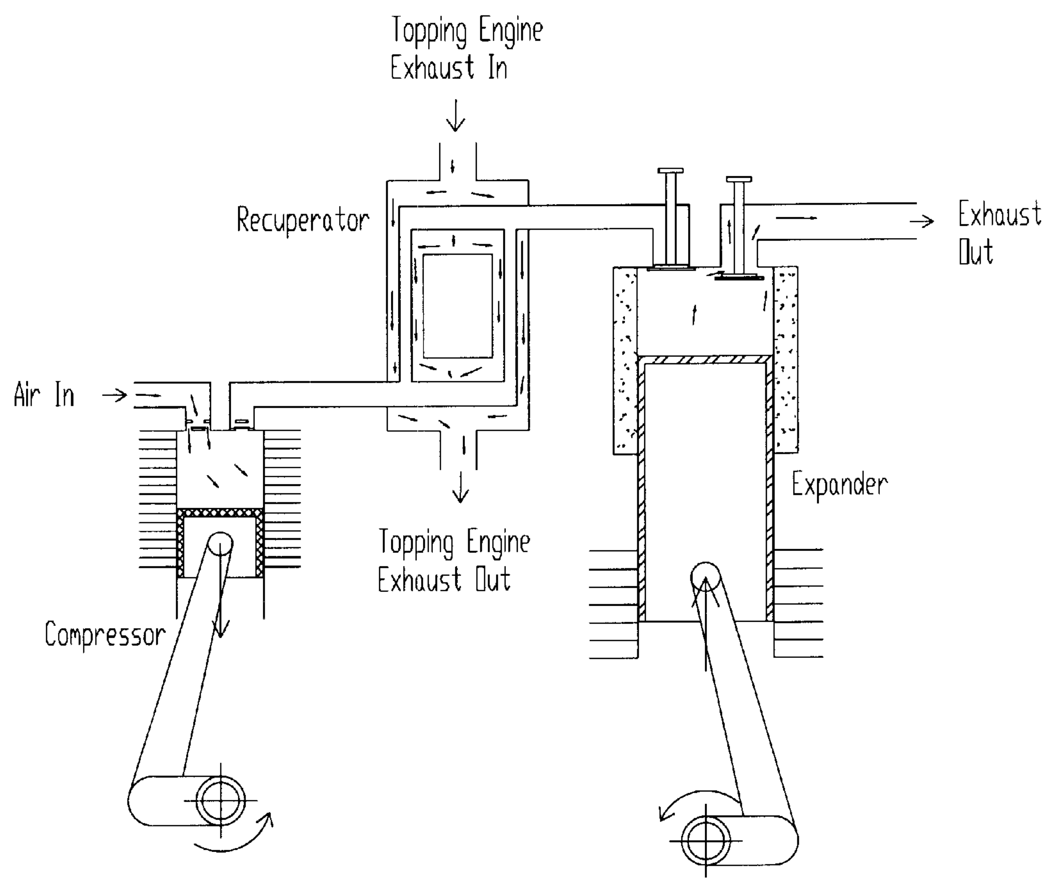

FIG. 26 shows the crank rotated 45 degrees from FIG. 25 with the compressor filling and the expander exhausting.

Alternative Methods of Manufacture

Figure 27:
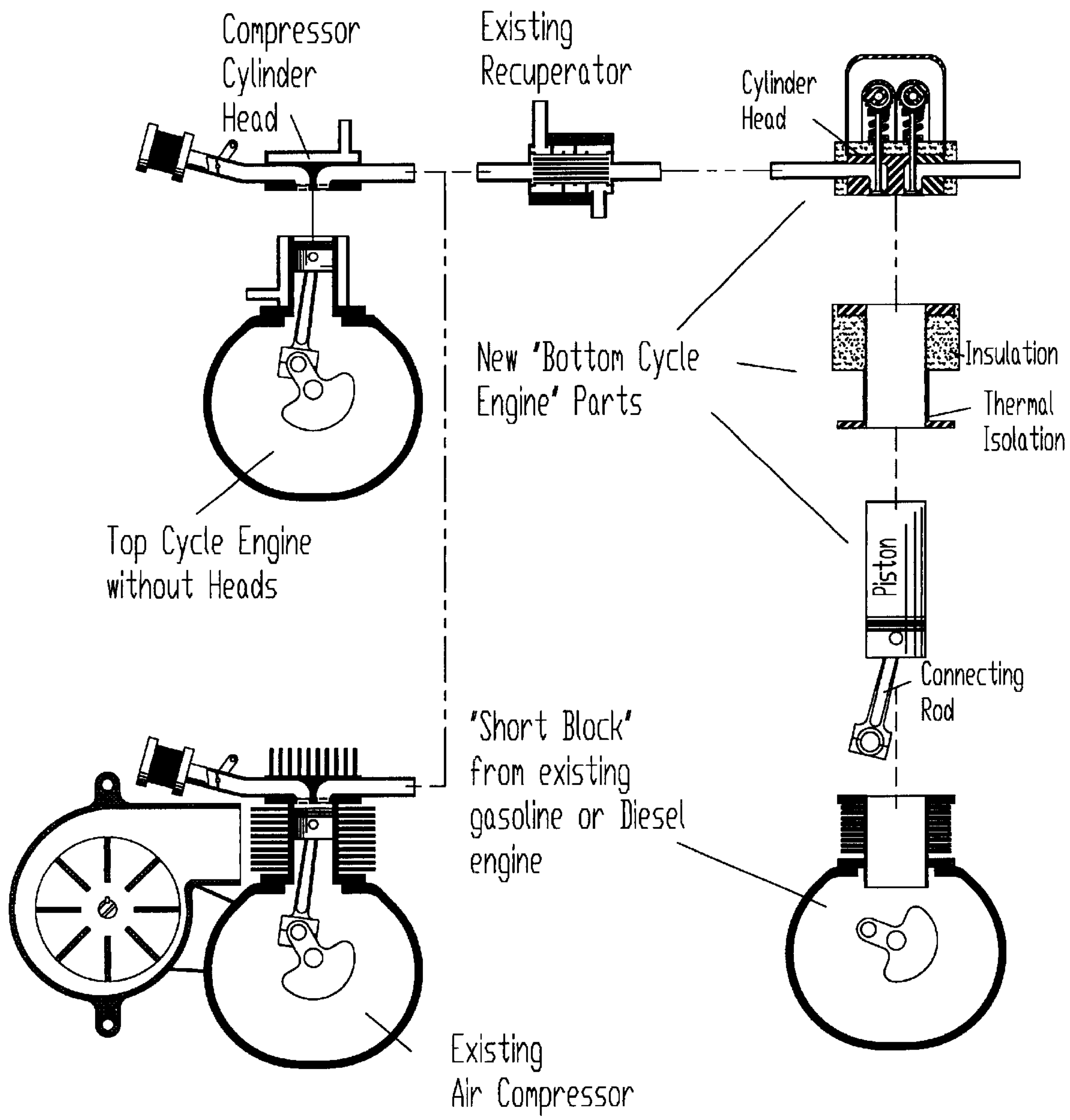
FIG. 27 is a diagram showing how the Reciprocating Hot Air Bottom Cycle Engine can be made utilizing an existing gasoline or Diesel engine blocks and/or an existing air compressor.

The simple mechanical arrangement of the invention facilitates several low cost methods of manufacture. FIG. 27 is an exploded view of the parts and how they can be obtained. The expander can make use of an existing “short block” from a reciprocating spark-ignition or Diesel engine that has approximately the needed bore and stroke. The expander is completed by adding the piston with its insulating extender (2D and 2E in FIGS. 6 and 7), the corresponding insulated cylinder pieces and a special bottom cycle engine cylinder head. The short block provides the crank, bottom end bearings, oil pump, and cooling system. Because the mean effective pressure in the bottom cycle engine is so much less than standard spark-ignition or Diesel engines, using the short block from such an engine assures long life in the bottom cycle application.

The compressor can also be made from a spark-ignition or Diesel engine by simply substituting compressor heads for the original engine heads. When the top cycle engine is a reciprocating engine, it is preferred that the block be identical to the block from the top cycle engine that will be used for the combined cycle. Since the compressor will then have the same displacement as the top cycle engine, matching the flows is automatic if the bottom cycle engine rotational speed is half the top cycle rotational speed for a four stroke top engine or the same as the top cycle rotational speed for a two stroke top engine. Water-cooled engines provide sufficient cooling to be modified for compressor use very easily.

Alternatively, an existing compressor can be used directly or with modifications to the cooling fins and/or blower to improve cooling effectiveness.

A very effective combined cycle engine can be made from two, ten cylinder, four stroke top cycle reciprocating engines by removing the heads from two of the cylinders on both engines, replacing them with compressor heads and replacing the remaining eight heads on the other engine with bottom cycle insulated thermal isolator cylinders and bottom cycle cylinder heads. The two engines will then produce about 48% of the original power with only about 40% of the original fuel consumption.

Figure 28:
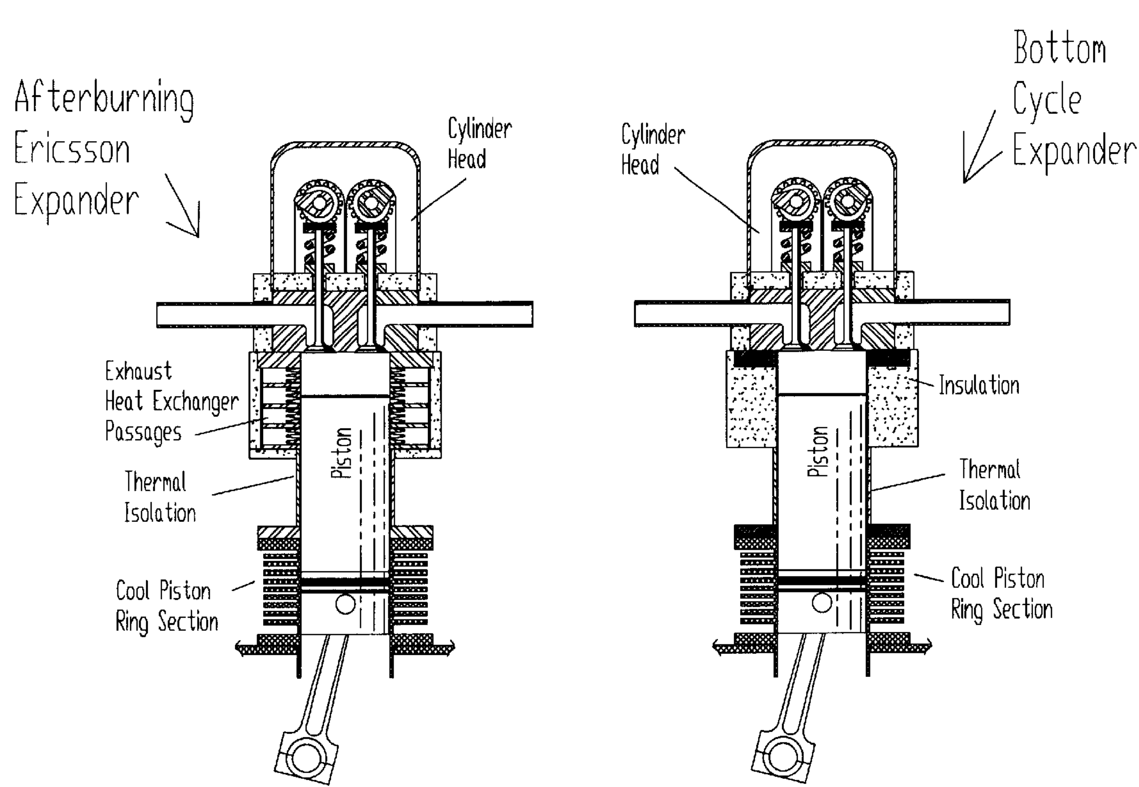
FIG. 28 is a section comparing the Reciprocating Hot Air Bottom Cycle Engine and Afterburning Ericsson Cycle expander construction.

FIG. 28 shows a comparison of the cross sections of an expander for an Afterburning Ericsson Cycle Engine with the expander for a Reciprocating Hot Air Bottom Cycle Engine. All the parts are identical except that the high temperature portions of the expander assembly have exhaust heat exchanger passages in the Afterburning Ericsson engine. The bottom cycle engine expander is a simpler insulated cylinder with no need for heating passages.

Engine Performance

Figure 29:
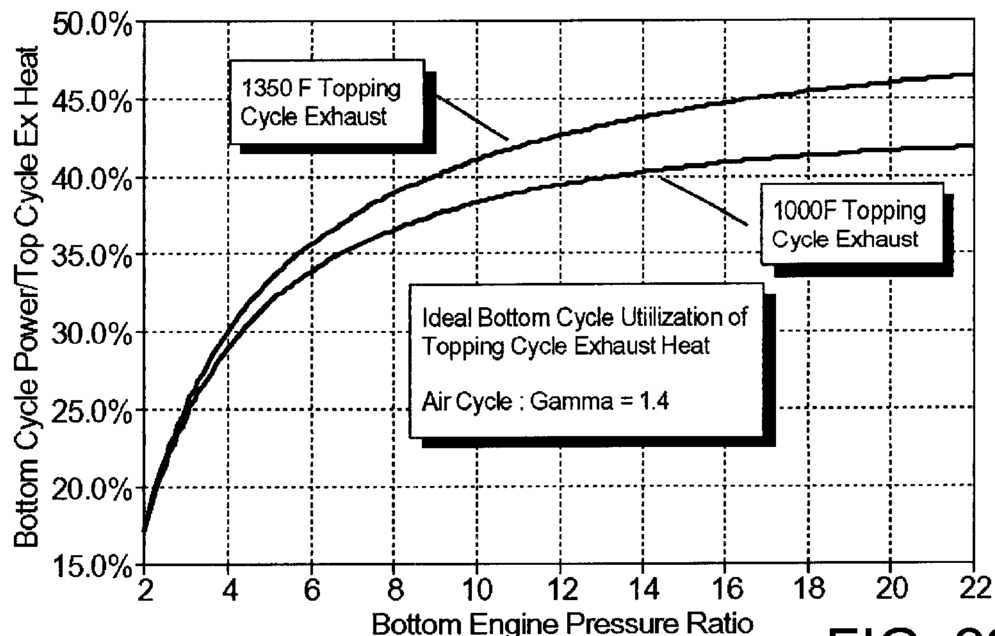
FIG. 29 is a graph of ideal heat recovery

FIG. 29 shows the effectiveness of an ideal Reciprocating Bottom Cycle Engine as a function of the bottom cycle engine pressure ratio for typical top cycle exhaust temperatures of 1350 F. and 1000 F. The figure shows that increasing pressure ratio increases the fraction of top cycle exhaust heat that can be converted into power. However, increasing the bottom cycle pressure ratio makes effective cooling of the compressor more difficult and complex. It also becomes very difficult to open and close the expander intake valve rapidly enough to achieve the required small cutoff volume. At this time, practical pressure ratios are 6 to 8.

Figure 30:
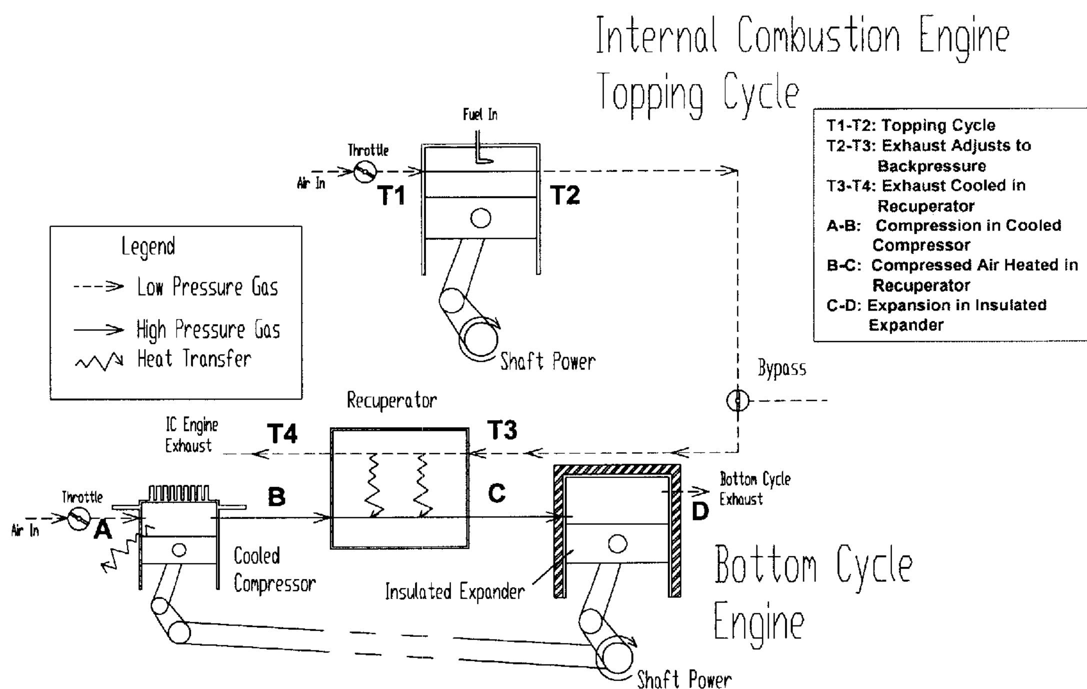
FIG. 30 is a state point location diagram of a Reciprocating Hot Air Bottom Cycle Engine coupled to an internal combustion top cycle engine.

FIG. 30 is the functional block diagram of FIG. 5 with numbers and figures indicating the location of state points used in a real cycle analysis of the combined cycle engine. The heat transfer and thermodynamic analysis of the Reciprocating Hot Air Bottom Cycle Engine can use the same techniques that were developed for the Afterburning Ericsson Cycle Engine and are documented in my U.S. Pat. No. 5,894,729 and in my SAE Paper 1999-01-2880, "Afterburning Ericsson Cycle Engine". The analytical results include real gas specific heat properties, actual pressure losses, realistic heat transfer processes, and mechanical friction. The following results are intended to show how the engine works when used with a Cummins G5.9, naturally aspirated, natural gas fueled reciprocating engine. These results are to show a typical case only and are not intended to limit the scope of the invention.

Figure 31:
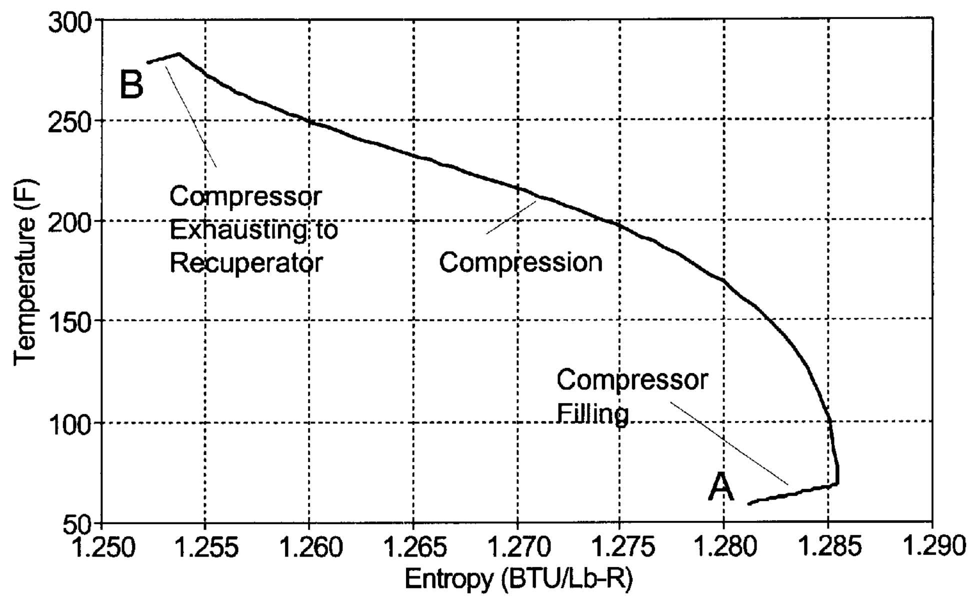
FIG. 31 is a temperature-entropy diagram of a single stage, air-cooled, compressor for a realistic bottom cycle engine.

FIG. 31 shows a temperature-entropy diagram for the single stage, air-cooled, reciprocating compressor in the real cycle process. Instead of an ideal isothermal process, the process is more complex. Starting at point A, where the air enters the compressor at room temperature and pressure, the air is actually warmed during compressor filling because the cylinder walls are hotter than ambient temperature. The compression process follows the filling process and begins with a somewhat isentropic process until the heat transfer to the cylinder walls becomes significant enough to aid in cooling the compression. Finally, the pressure reaches the point where the compressor exhaust valve opens and the compressed air is pushed into the recuperator. This most simple of compressors is shown to be very effective in approaching the desired operation. Although, not isothermal, the peak temperature is 200 F cooler than it would be without cooling and a significant reduction in compression power is achieved.

Figure 32:
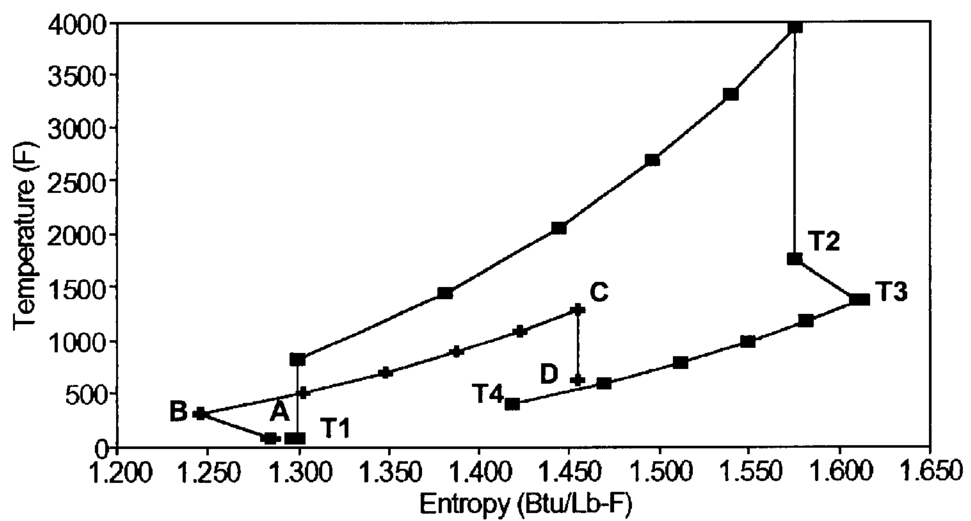
FIG. 32 is a temperature-entropy diagram of a realistic, 6.8:1 pressure ratio, Reciprocating Hot Air Bottom Cycle Engine coupled to a Cummins G5.9 natural gas top cycle engine.

FIG. 32 shows the temperature-entropy diagram for the complete combined cycle with the points T1 through T4 and A,B,C,D matching FIG. 30. The process is not ideal but is sufficient to increase the available shaft horsepower from the 104 horsepower of the Cummins engine alone to 126 horsepower for the combined cycle. The power increase is obtained with the same fuel flowrate so the specific fuel consumption is reduced by 17.5%. This is a very significant improvement that can be achieved with the need for a complex bottom cycle engine.

CONCLUSION, RAMIFICATIONS AND SCOPE

The Reciprocating Hot Air Bottom Cycle Engine meets the object of providing a simple means of recovering the exhaust from a top cycle engine. Obviously, within the purview of the Reciprocating Hot Air Bottom Cycle Engine here disclosed, many hardware modifications and variations are possible. The bottom cycle engine can be attached to other types of top cycle systems, such as Solid Oxide Fuel Cells or industrial processes that have significant exhaust losses. It is also clear that there are numerous methods for constructing the engine using a mix of new and existing reciprocating engine parts. It is therefore understood that, within the scope of the appended claims and their legal equivalents, the invention may be practiced otherwise than as specifically described.

I claim:

1. A combined cycle thermodynamic means for producing useful work from a primary source of heat and/or chemical energy, said thermodynamic means comprising:

a: a top cycle means for generating useful work and a stream of heated exhaust gas from said primary source of heat and/or chemical energy;

b: a bottom cycle means for generating additional useful work from said stream of heated exhaust gas from said top cycle means; said bottom cycle means approximating the thermodynamically ideal bottom cycle of isothermal compression, recuperative heating from said top cycle exhaust, followed by isentropic expansion; said bottom cycle means comprising:

i. a counterflow heat exchange recuperator means for transferring heat from said stream of heated exhaust gas to said bottom cycle means by heating the air used by said bottom cycle means to a temperature substantially approaching the temperature of said stream of heated exhaust gas;

ii. a reciprocating compressor means of at least one compressor cylinder for compressing ambient air to a peak pressure while using cooling means to remove heat from said compressor cylinder whereby compression work is minimized;

iii. a reciprocating expander means of at least one expander cylinder for receiving said heated air from said recuperator means and for expanding said heated air to a low pressure and temperature while using insulation means to contain heat within said expander cylinder whereby expansion work is maximized and wherein said expander means is mechanically connected to said compressor means whereby said compressor means receives compression work from said heated air expansion within said expander means;

c: a control means for regulating the rotational speed and power output of said bottom cycle means.

2. The combined cycle means of claim 1 whereby said control means is a fixed mechanical means joining said top cycle means and said bottom cycle expander means, said fixed mechanical means having a speed ratio corresponding to the ratio of the displacements of said top cycle means and said compressor means whereby both top and bottom cycle means are mechanically connected; whereby the heat capacity flows of both said heated exhaust gas from said top cycle means and said air in said bottom cycle means are substantially equal; whereby the heat transfer in said recuperator means is optimal and whereby the combined cycle means can be controlled with the controls for said top cycle means alone.

3. The combined cycle means of claim 2 further comprising a clutch in said mechanical means whereby said top cycle means can be started independently of said bottom cycle means by disengaging said clutch, whereby said bottom cycle means can then be started by engaging said clutch, and whereby said bottom cycle means can be stopped independently of said top cycle means by disengaging said clutch.

4. The combined cycle means of claim 1 whereby said control means is a bypass means for diverting said hot exhaust gases before they enter said recuperator whereby said bottom cycle means is controlled.

5. The combined cycle means of claim 1 whereby said control means is a throttle valve in the air inlet to said compressor means whereby said bottom cycle means is controlled.

6. The combined cycle means of claim 1 wherein said compressor means is at least one compressor cylinder comprising at least one compressor intake valve and at least one compressor exhaust valve and a reciprocating compressor piston connected by a compressor connecting rod to a compressor crankshaft and wherein said expander means is at least one expander cylinder comprising at least one expander intake valve and at least one expander exhaust valve and a reciprocating expander piston connected by an expander connecting rod to an expander crankshaft, with said compressor and expander crankshafts mechanically coupled for proper operation of said bottom cycle means during one revolution of said crankshafts whereby said linked crankshafts transmit shaft work output to a load.

7. The combined cycle means of claim 6 wherein said expander piston has a thin high-temperature resistant, low thermal conductivity, extension which allows the rings on said expander to operate at a low temperature with conventional oil for lubrication and which also reduces the conduction heat loss from said expander air through said expander piston and wherein said expander intake valve and said expander exhaust valve are made of temperature resistant material such as ceramic or heat resistant alloy and wherein said expander intake valve is mechanically operated together with said mechanically coupled crankshafts whereby said peak pressure is controlled at the desired value.

8. The combined cycle means of claim 6 wherein said compressor cooling means comprises external cooling fins from which the heat of compression is removed by a blower powered by said linked crankshafts.

9. The combined cycle means of claim 6 wherein said compressor cooling means comprises external cooling jackets through which is circulated a coolant that removes the heat of compression via a radiator.

10. The combined cycle means of claim 6 wherein said compressor means is a staged reciprocating compressor comprised of at least two cylinders and an inter-cooler whereby removal of heat of compression is improved.

11. The combined cycle means of claim 1 wherein said compressor means is an inter-cooled rotary compressor such as a Roots blower or scroll compressor.

12. The combined cycle means of claim 8, claim 9, claim 10 or claim 11 wherein said compressor means is a commercially available air compressor.

13. The combined cycle means of claim 8 or claim 9 wherein a portion of said compressor means is comprised of an appropriate commercially available engine block comprising said reciprocating compressor cylinder, compressor cylinder cooling means, compressor piston, compressor connecting rod, and compressor crankshaft whereby the compressor means can be completed by the simple addition of a compressor cylinder head containing said compressor inlet and exhaust valves.

14. The combined cycle means of claim 7 wherein said low temperature for said piston rings is maintained by external cooling fins on said expander cylinder through which the small amount of heat conducted through said piston extension and said expander cylinder is removed by convection and radiation.

15. The combined cycle means of claim 7 wherein said low temperature for said piston rings is maintained by external cooling jackets through which is circulated a coolant that removes the small amount of heat conducted through said piston extension and said expander cylinder via a radiator.

16. The combined cycle means of claim 14 or 15 wherein a portion of said expander means is comprised of an appropriate commercially available engine block comprising said low temperature portion of said reciprocating expander cylinder, said expander cylinder cooling means, and said expander crankshaft whereby the expander means can be completed by the simple addition of said expander piston with said piston extension, the high temperature/insulated portion of said expander cylinder and an expander cylinder head containing said compressor inlet and exhaust valves.

* * * * *